(12) United States Patent
Nielsen

(10) Patent No.: US 7,426,317 B2
(45) Date of Patent: Sep. 16, 2008

(54) IMAGE PROCESSING APPARATUS AND IMAGE PROCESSING METHOD, STORAGE MEDIUM AND COMPUTER PROGRAM

(75) Inventor: Frank Nielsen, Tokyo (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 10/467,143

(22) PCT Filed: Nov. 21, 2002

(86) PCT No.: PCT/JP02/12150

§ 371 (c)(1), (2), (4) Date: Aug. 4, 2003

(87) PCT Pub. No.: WO03/049030

PCT Pub. Date: Jun. 12, 2003

(65) Prior Publication Data
US 2004/0076340 A1 Apr. 22, 2004

(30) Foreign Application Priority Data
Dec. 7, 2001 (JP) .............................. 2001-375035

(51) Int. Cl.
G06K 9/36 (2006.01)
G09G 5/00 (2006.01)
H04N 9/74 (2006.01)

(52) U.S. Cl. .................. 382/284; 345/629; 348/584

(58) Field of Classification Search .................. 382/284, 382/285; 345/629–641; 348/584–601
See application file for complete search history.

(56) References Cited

U.S. PATENT DOCUMENTS 5,444,478 A * 8/1995 Lelong et al. .................. 348/39
5,586,231 A * 12/1996 Florent et al. ............... 345/472
5,987,164 A 11/1999 Szeliski et al.

(Continued)

FOREIGN PATENT DOCUMENTS

JP 5-110926 4/1993

(Continued)

OTHER PUBLICATIONS

Yalin Xiong et al., "Registration, Calibration and Blending in Creating High Quality Panoramas," Fourth IEEE Workshop on Applications on Computer Vision, pp. 69-74 (1998).

(Continued)

Primary Examiner—Matthew C. Bella
Assistant Examiner—Randolph Chu
(74) Attorney, Agent, or Firm—Finnegan, Henderson, Farabow, Garrett & Dunner, L.L.P.

(57) ABSTRACT

Corresponding points are searched based on an error between light beam vectors projected on a projection plane without performing comparison between pixel values at the corresponding points. The necessity for use of cameras having a same camera lens or a same distortion parameter is eliminated, and picked up images of different camera models can be connected to each other. Since original picked up images are pasted directly to an output frame based on errors between light beam vectors without transforming any picked up image once into a pinhole image, deterioration of pixels can be suppressed. Accordingly, picked up images of various cameras which are different in terms of the lens distortion or the camera model from each other can be suitably pasted together.

11 Claims, 23 Drawing Sheets

U.S. PATENT DOCUMENTS 6,075,905 A * 6/2000 Herman et al. ............... 382/284
6,157,747 A * 12/2000 Szeliski et al. ............... 382/284

FOREIGN PATENT DOCUMENTS

| | | |
|---|---|---|
| JP | 05-110926 | 4/1993 |
| JP | 07-006227 | 1/1995 |
| JP | 7-6227 | 1/1995 |
| JP | 7-135605 | 5/1995 |
| JP | 07-135605 | 5/1995 |
| JP | 07-220057 | 8/1995 |
| JP | 7-220057 | 8/1995 |
| JP | 10-247234 | 9/1998 |
| JP | 11-136575 | 5/1999 |
| JP | 2000-67227 | 3/2000 |
| JP | 2000-067227 | 3/2000 |
| JP | 2000-115639 | 4/2000 |

OTHER PUBLICATIONS

Heung-Yeung Shum et al., "Construction of Panoramic Mosaics with Global and Local Alignment," International Journal of Computer Vision, 36(2), pp. 101-130 (2000).

Satyan Coorg et al., "Spherical Mosaics with Quaternions and Dense Correlation," International Journal of Computer Vision, 37(3), pp. 256-273 (2000).

R. Swaminathan et al., "Non-Metric Calibration of Wide Angle Lenses and Polycameras," IEEE Journal on Pattern Analysis and Machine Intelligence, pp. 1171-1178 (2000).

Roger Y. Tsai, "A Versatile Camera Calibration Technique for High-Accuracy 3D Machine Vision Metrology Using Off-the-Shelf TV Cameras and Lenses," IEEE Journal of Robotics and Automation, v. RA-3, pp. 323-344 (1987).

S. E. Chen, "QuickTime VR—An Image-Based Approach to Virtual Environment Navigation," Computer Graphics Proceedings, Annual Conference Series (SIGGRAPH '95), pp. 29-38 (1995).

Roger Y. Tsai, "An Efficient and Accurate Camera Calibration Technique for 3D Machine Vision," Proc. of IEEE Conference of Computer Vision and Pattern Recognition, pp. 364-374 (1986).

J. More, "The Levenberg-Marquardt algorithm: Implementation and theory," Numerical Analysis, Lecture Notes in Mathematics 630, Springer Verlag, pp. 105-116 (1977).

B. Triggs et al., "Bundle Adjustment—A Modern Synthesis," Vision Algorithms: Theory and Practice, Lecture Notes in Computer Science 1883, Springer Verlag, pp. 298-375 (2000).

Supplemental European Search Report, dated Aug. 17, 2007.

Szeliski et al., "Creating Full View Panoramic Image Mosaics and Environment Maps," Computer Graphics Proceedings, Proceedings of SIGGRAPH Annual International Conference on Computer Graphics Interactive Techniques pp. 251-258 (1997). XP002378648.

* cited by examiner

OMNIDIRECTIONAL IMAGE
PICKUP APPARATUS

F I G. 7
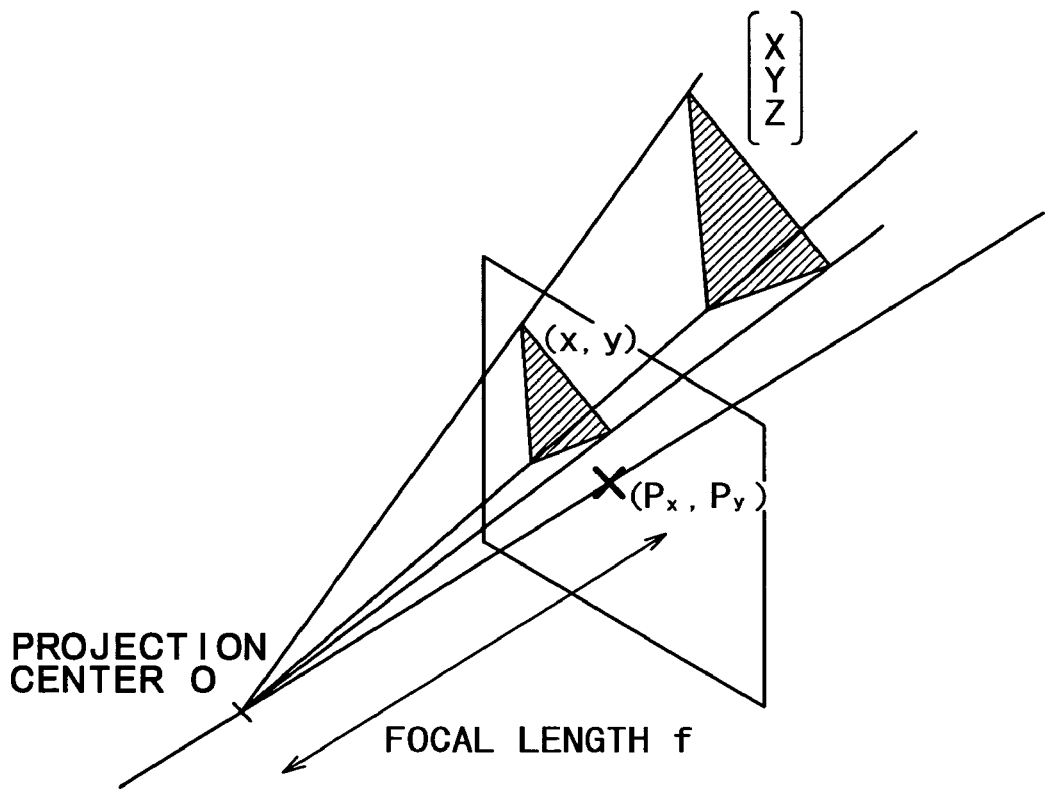
F I G. 8
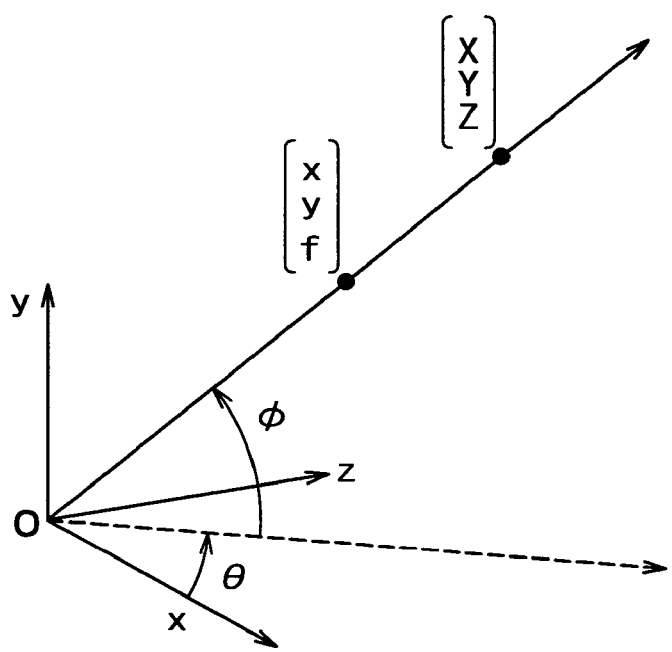

FIG. 10

CALCULATE CORRESPONDING COORDINATES $(\tilde{x}, \tilde{y})$ OF IDEAL PINHOLE IMAGE FROM POINTS $(x, y)$ ON PROJECTION PLANE $$\tilde{x} = x + (x - C_x) \kappa r^2$$
$$\tilde{y} = y + (y - C_y) \kappa r^2$$

WHERE $r^2 = (x - c_x)^2 + \{(y - c_y) a_y\}^2$ — S11

ACQUIRE THREE-DIMENSIONAL COORDINATE $P_{\theta,\phi}$ OF LIGHT BEAM VECTOR ON UNIT SPHERE $$P_{\theta,\phi} \simeq K \begin{pmatrix} \tilde{x} \\ \tilde{y} \\ 1 \end{pmatrix}$$

$$P_{\theta,\phi} = \begin{pmatrix} P_{\theta,\phi}\langle x \rangle \\ P_{\theta,\phi}\langle y \rangle \\ P_{\theta,\phi}\langle z \rangle \end{pmatrix} \quad \text{WHERE } P_{\theta,\phi} = \frac{P_{\theta,\phi}}{\|P_{\theta,\phi}\|}$$

— S12

ACQUIRE $(\theta, \phi)$ POLAR COORDINATE VALUES OF LIGHT BEAM VECTOR FROM LIGHT BEAM VECTOR $P_{\theta,\phi}$ $$\phi = \arcsin P_{\theta,\phi}\langle y \rangle$$

$$\theta = \arccos \frac{P_{\theta,\phi}\langle z \rangle}{\cos \phi}$$

TRANSFORM POLAR COORDINATE VALUES ($\theta, \phi$) OF LIGHT BEAM VECTOR ON UNIT SPHERE INTO POINT $P_{\theta,\phi}$ OF THREE-DIMENSIONAL ORTHOGONAL COORDINATE SYSTEM $$P_{\theta,\phi} = \begin{pmatrix} \sin\theta \cos\phi \\ \sin\phi \\ \cos\theta \cos\phi \end{pmatrix}$$

~S21

TRANSFORM INTO COORDINATE VALUES ($\tilde{x}, \tilde{y}$) ON IDEAL PINHOLE IMAGE $$(\tilde{x}, \tilde{y}) = K P_{\theta,\phi}$$

$$K = \begin{bmatrix} f_x & 0 & P_x \\ 0 & f_y & P_y \\ 0 & 0 & 1 \end{bmatrix}$$

~S22

DETERMINE CORRESPONDING COORDINATE VALUES (x, y) ON ORIGINAL IMAGE OF Tsai'S MODEL FROM COORDINATE VALUES (x, y) ON IDEAL PINHOLE IMAGE $$\tilde{r} = \sqrt{(\tilde{x} - c_x)^2 + (\tilde{y} - c_y)^2}$$

~S23

F I G. 1 9

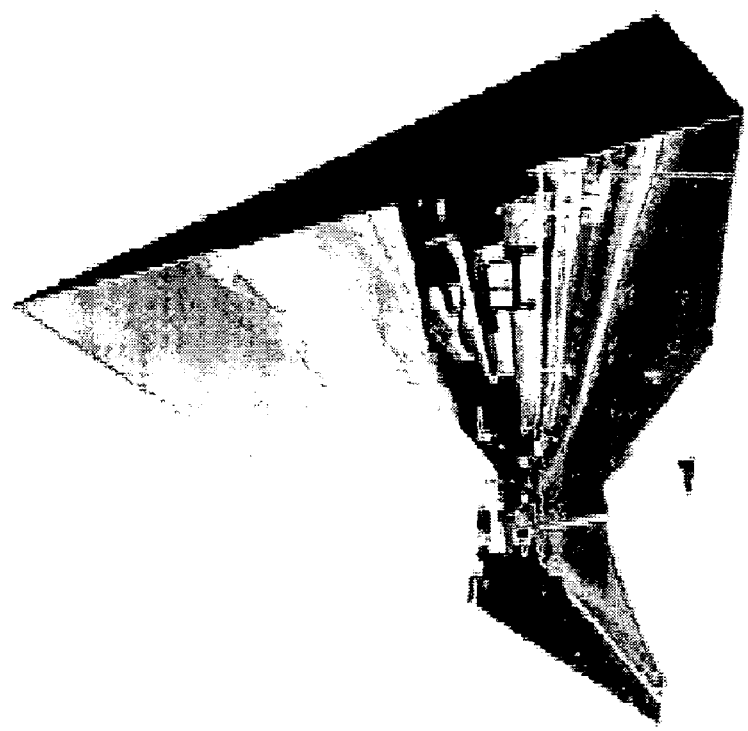
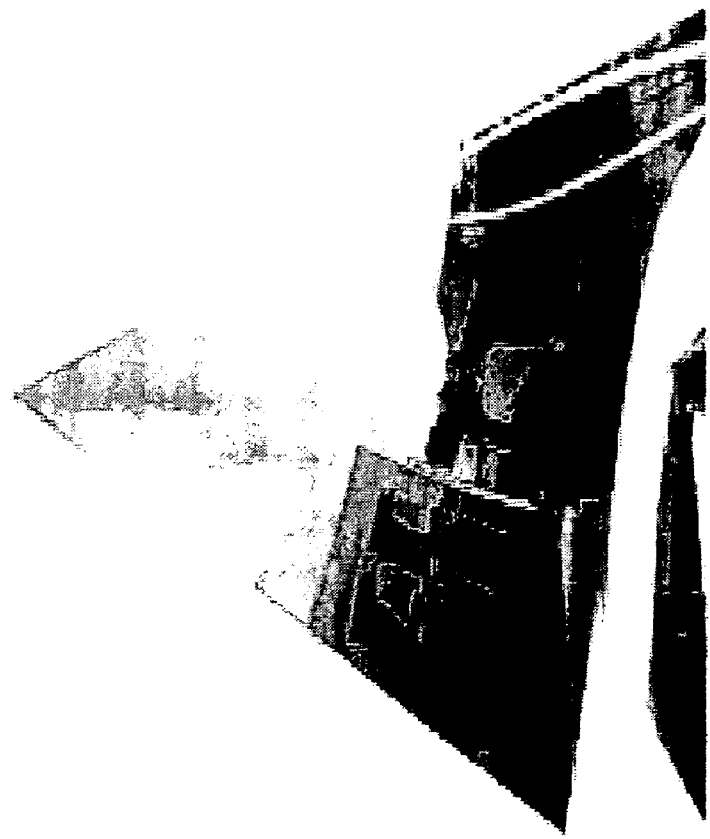
FIG. 22

F I G. 23
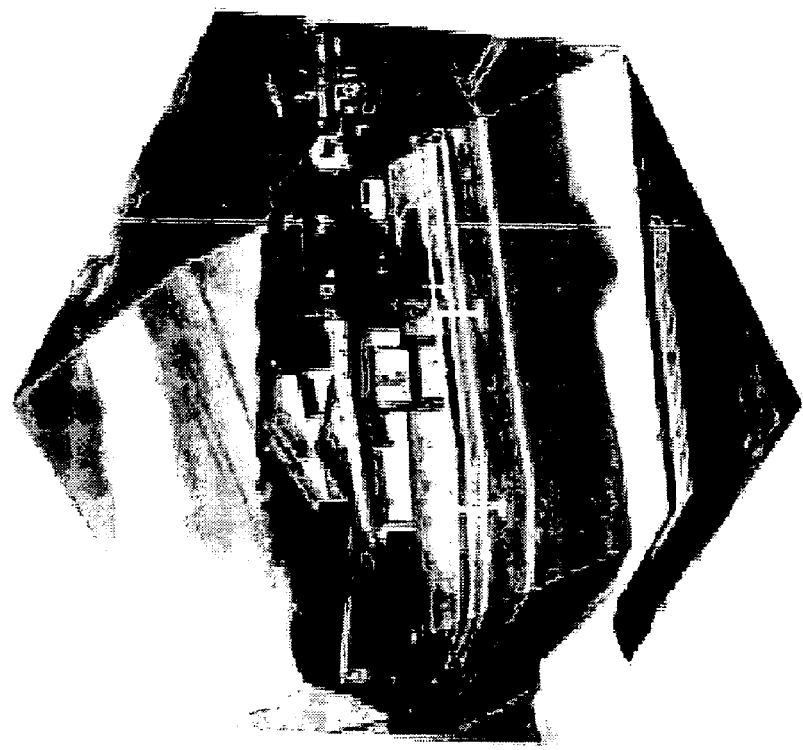
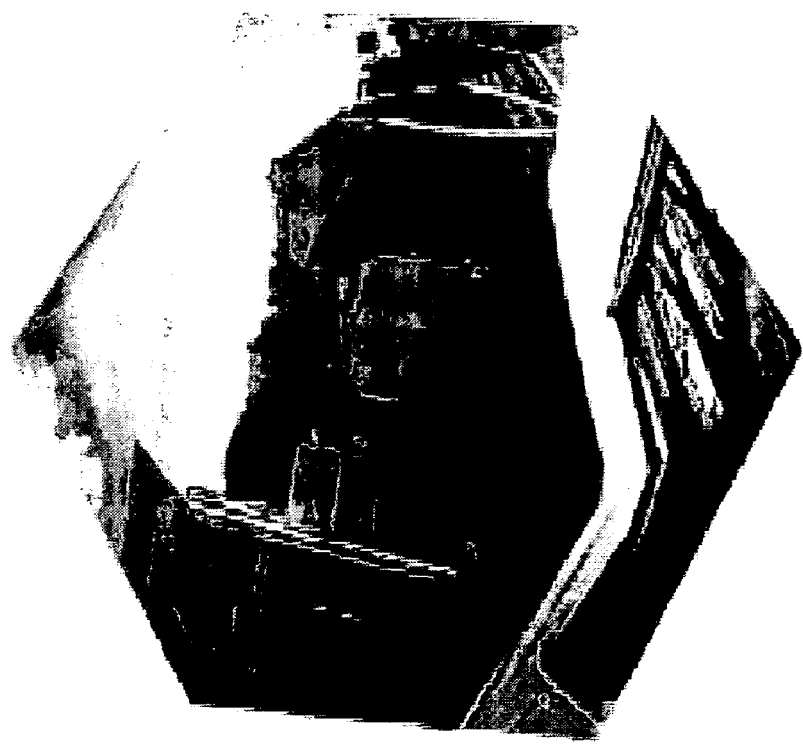

FIG. 24
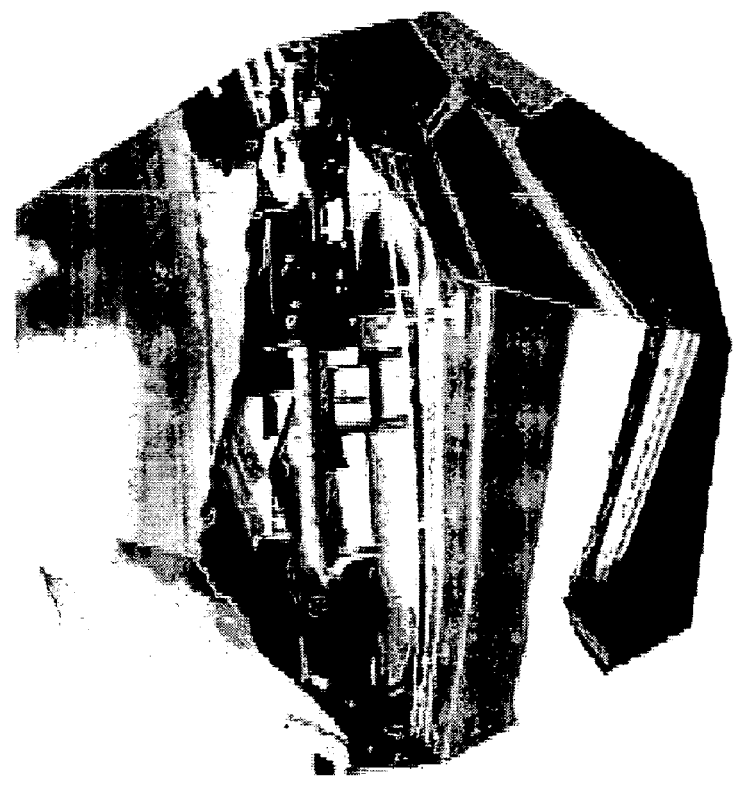
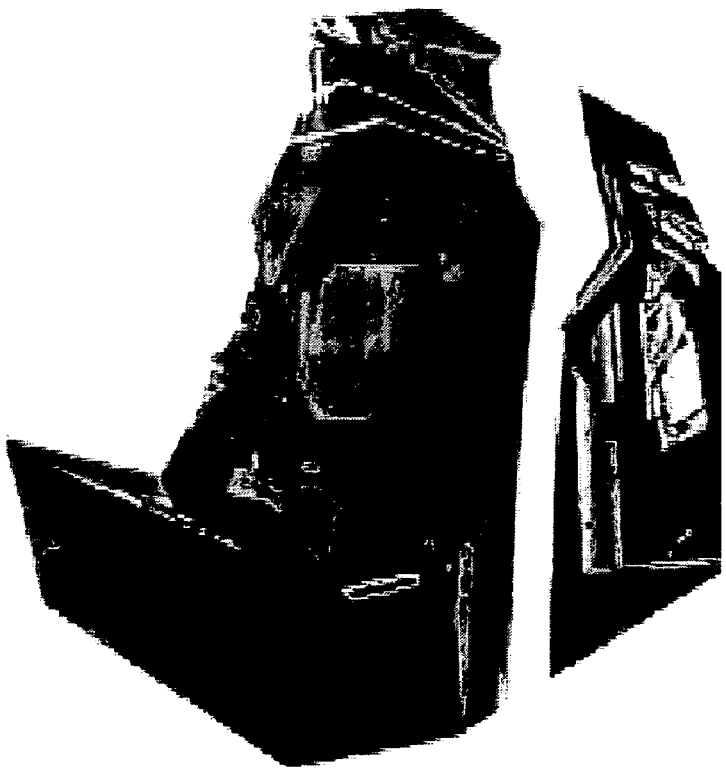

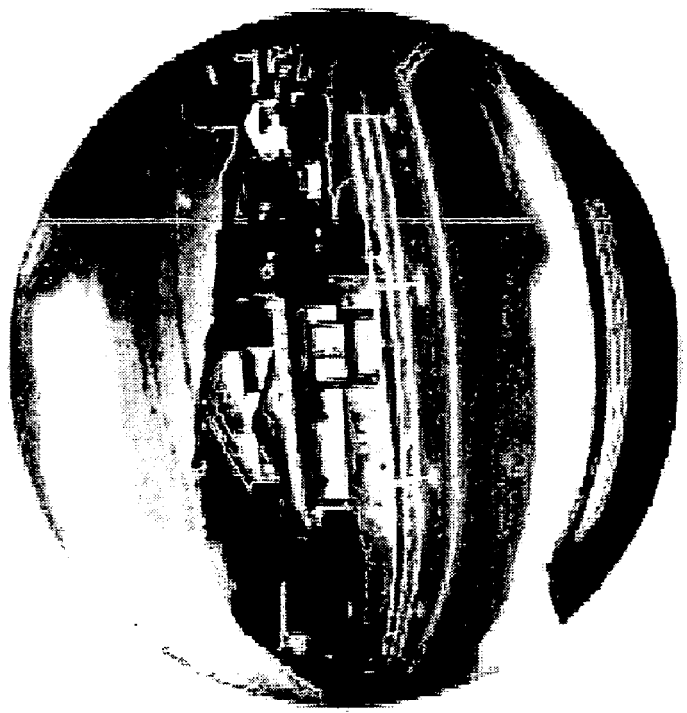
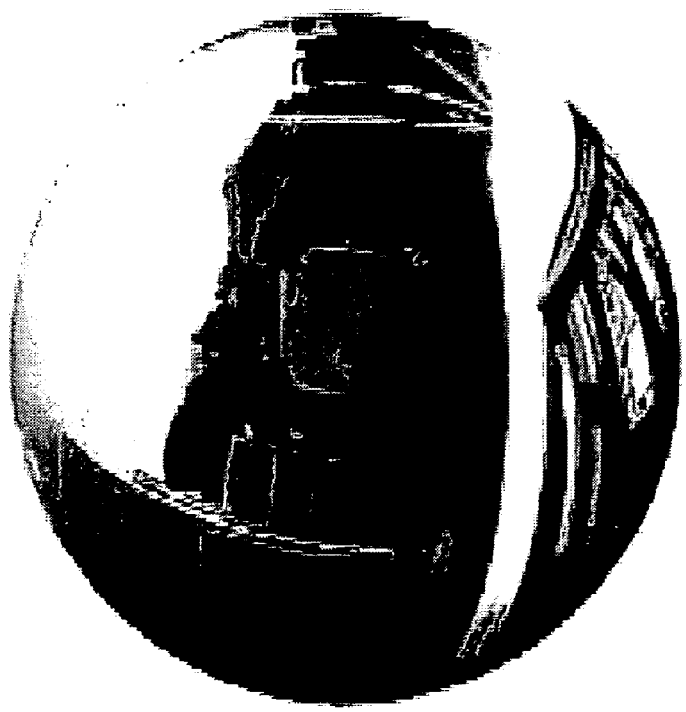
FIG. 25

IMAGE PROCESSING APPARATUS AND IMAGE PROCESSING METHOD, STORAGE MEDIUM AND COMPUTER PROGRAM

TECHNICAL FIELD

This invention relates to an image processing apparatus and an image processing method, a storage medium, and a computer program wherein a plurality of picked up images are pasted together, and more particularly to an image processing apparatus and an image processing method, a storage medium, and a computer program wherein images obtained by picking up neighboring regions in a space using a plurality of cameras are pasted together.

More specifically, the present invention relates to an image processing apparatus and an image processing method, a storage medium, and a computer program wherein picked up images by cameras which are different in terms of the lens distortion or the camera model are pasted together, and more particularly to an image processing apparatus and an image processing method, a storage medium, and a computer program wherein a plurality of picked up images are pasted together while suppressing the deterioration of the images.

BACKGROUND ART

An omnidirectional camera is known as an apparatus for providing a landscape image around a user. An omnidirectional video image system of the type mentioned is typically formed from a plurality of cameras disposed so as to pick up images around a certain one point in a space determined as a visual point. An omnidirectional video image system formed from a plurality of cameras performs an image process of suitably pasting together boundaries of picked up images of neighboring ones of the cameras to produce an image over a wide region much greater than the visual field of each of the cameras as an image which looks as if it were picked up by a single wide angle camera.

Although a camera can pick up an image over a wide range if a lens having a wide view angle is used for the camera, the resolution decreases as much and particulars of a picked up image become less distinguishable. In contrast, where an omnidirectional video image system is used, a picked up image over a wide range can be provided with a high resolution maintained.

Where such an omnidirectional video image as just described is used, a video image of the free visual point type can be enjoyed. For example, in a television game wherein a character (the cast) can move about freely in a space, a background screen from an arbitrary visual point can be displayed. Consequently, the game can be enjoyed through a more real video image and is augmented in the entertainment property.

Further, while an omnidirectional video image has a great capacity when compared with an ordinary video image, since it is superior in the interactivity, it is promising as new contents in the broadband network age.

Incidentally, most of existing cameras ideally employ central projection based on a pinhole camera model. The central projection signifies arrangement of a color concentration value at each point of the surface of a three-dimensional object at an intersecting point between a straight line (also called "line of sight") interconnecting the center of projection and the point on the surface of the object and a projection screen of the camera, and forms a projection image. The central projection has a characteristic that, even if an object of the same size is projected, as the object moves toward the center of projection of the camera, it is projected as an image of an increased size, but as the object moves away from the center of projection, it is projected as an image of a decreased size.

Meanwhile, an ideal pinhole camera model has a characteristic that points on the same line of sight are projected at the same position on the projection screen (that is, the picked up image plane) irrespective of the difference in distance from the center of projection of the camera. Accordingly, picked up images by neighboring cameras are disposed such that the centers of projection of the cameras may coincide with each other so that the cameras may have common lines of sight. As a result, while the different cameras are used, an image equivalent to that picked up by a single camera viewed from the same place is obtained. In other words, even if an arbitrary place in overlapping image pickup regions of neighboring cameras is designated as the boundary between the images, the picked up images are pasted together smoothly.

For example, a paper by Yalin Xiong and Ken Turkowski, "Registration, Calibration and Blending in Creating High Quality panoramas", Fourth IEEE Workshop on Applications of Computer Vision, pp. 69-74, 1998, another paper by Heung-Yeung Shum and Richard Szeliski, "Construction of Panoramic mosaics with global and local alignment", International Journal of Computer Vision, 36(2), pp. 101-130, 2000 and U.S. Pat. No. 6,157,747 propose techniques of pasting neighboring images picked up together using ideal pinhole cameras. Further, a paper by Satyan Coorg and Seth Teller, "Spherical Mosaics with Quaternions and Dense Correlation", International Journal of Computer Vision, 37(3), pp. 259-273, 2000 proposes a technique of pasting a large number of picked up images together ignoring the lens distortion.

Actually, ideal pinhole cameras are seldom available, and a lens usually has distortion which cannot be ignored. Further, since a camera generally has a volume, it is physically impossible at all to dispose a plurality of cameras so that the image pickup centers of them are concentrated upon a single point. Also assembly of three or more cameras so that the image pickup centers of them coincide with one another in a three-dimensional space requires very difficult operations.

For example, a paper by R. Swaminathan and S. Nayar, "Non-Metric Calibration of Wide Angle Lenses and Polycameras", IEEE Journal on Pattern Analysis and Machine Intelligence, pp. 1171-1178, 2000 proposes to transform picked up images of cameras once into pinhole images and then paste the pinhole images together in order to solve the problem of image pasting described above with regard to a camera model which has lens distortion in a diametrical direction and a tangential direction. In this instance, however, in order to complete an omnidirectional video image formed from a plurality of image frames pasted together, pixel interpolation must be performed totally twice, that is, upon transformation into pinhole images and upon pasting of the images. This gives rise to significant deterioration of the images.

It is to be noted that a paper by Y. Xiong and K. Turkowski, "Creating image-based VR using a self-calibrating fisheye lens", IEEE Computer Society Conference on Computer Vision and Pattern Recognition, pp. 237-243, 1997 proposes a technique for pasting images picked up by a fisheye lens as a lens other than a pinhole lens.

Meanwhile, a paper by R. Y. Tsai, "A versatile Camera Calibration Technique for High Accuracy 3D Machine Vision Metrology Using Off-the-Shelf TV Cameras and Lenses", IEEE Journal of Robotics and Automation, Vol. RA-3, No. 4, pp. 323-344, 1987 discloses a technique of calculating a distortion parameter of lenses of various camera models at a high speed and with a high degree of accuracy.

In order to paste together a plurality of picked up images from different cameras to construct an omnidirectional image, preferably the cameras are ideal pinhole cameras. Therefore, input images from the cameras must be pasted together after removal of lens distortion and transformation into pinhole images are performed. However, this repeats pixel transformation two or more times, resulting in significant deterioration of the picture quality. Further, the angular field of view of pinhole cameras is 180 degrees to the utmost.

Further, since camera images having different internal parameters or different distortion parameters cannot be pasted together well, it is necessary to uniformly use picked up images from cameras of the same lens model as original images to be pasted together. In other words, the flexibility of the image pickup system in the design configuration is poor.

Also it is possible to form an omnidirectional video image from a plurality of video images picked up from different places using only a single camera taking the facility in pasting of camera images into consideration. For example, a paper by S. E. Chen, "QuickTime VR—an image-based approach to virtual environment navigation", Computer Graphics (SIGGRAPH '95), pp. 29-38, August 1995 describes a technique of forming an omnidirectional video image from a plurality of video images picked up at several places using only a single camera. The technique, however, cannot cope with such a case that video images in different image pickup directions are picked up and supplied simultaneously on the real time basis.

DISCLOSURE OF INVENTION

It is an object of the present invention to provide a superior image processing apparatus and image processing method, storage medium, and computer program by which images picked up from neighboring regions in a space using a plurality of cameras can be pasted together suitably.

It is another object of the present invention to provide a superior image processing apparatus and image processing method, storage medium, and computer program by which images picked up by cameras different in terms of the lens distortion or the camera model can be pasted together suitably.

It is a further object of the present invention to provide a superior image processing apparatus and image processing method, storage medium, and computer program by which image picked up by cameras different in terms of the lens distortion or the camera model can be pasted together without deterioration of the images which may be caused by transformation of the images into those of a different camera model such as a pinhole camera.

The present invention has been made in view of the subject described above, and according to a first aspect of the present invention, an image processing apparatus or image processing method for pasting together a plurality of image frames picked up by different cameras including:

light beam vector calculation means for or a light beam vector calculation step of calculating a light beam vector projected at each point on a projection plane by the cameras used for image pickup based on a camera model; and optimization means for or an optimization step of optimizing pasting of images so that an error of information based on light beam vectors at each corresponding characteristic points between neighboring image frames may be minimized.

With the image processing apparatus or image processing method according to the first aspect of the present invention, pasting together of two images is performed so that an error of information based on light beam vectors at corresponding points on the projection plane may be minimized without depending upon whether or not pixel values coincide with each other between the images. Accordingly, as light beam vectors are produced taking also camera models and distortion parameters of the cameras into consideration, the necessity for use of cameras having a same camera lens or a same distortion parameter is eliminated and picked up images of different camera models can be pasted together.

It is to be noted that the error of information based on light beam vectors here signifies, for example, an angle defined by two light beam vectors or a difference between luminance values or between pixel values of pixels indicated by the light beam pixels.

Further, with the image processing apparatus or image processing method according to the first aspect of the present invention, since images are pasted together so that an error of information based on light beam vectors between corresponding pixels may be minimized without using comparison between pixel values, there is no necessity to transform a picked up image once into a pinhole image or a like image. Further, since the original picked up images can be pasted directly with each other, deterioration of the pixels can be suppressed.

Here, the light beam vector calculation means or step may divide the projection plane of each of the cameras into numerous polygons and produce a "mesh camera" which describes a corresponding relationship between coordinates of vertices of the polygons on the projection planes and light beam vectors corresponding to the coordinates in advance.

In such an instance, the optimization means or step may determine a transform function for transforming the coordinate values of individual points in the polygons on the projection plane into the light beam vectors based on the light beam vectors at the vertices of the polygons and use the transform function to calculate the light beam vectors at the characteristic points.

Further, the optimization means or step may calculate, as a first stage of optimization, the transform function from a characteristic point into a light beam vector in a unit of a polygon and rotate a unit of an image frame so that an error of information based on the light beam vectors at the characteristic points may be minimized while fixed transform functions are used as the transform functions to perform an optimization process not on the projection plane of the picked up image but on the light beam coordinate system.

As a second stage of optimization, the optimization means or step may calculate the transform function from a characteristic point into a light beam vector in a unit of a polygon and perform an optimization process in a unit of a polygon so that an error of information based on the light beam vectors at the characteristic points may be minimized while variable transform functions are used as the transform functions.

As a third stage of optimization, the optimization means or step may take a light intensity of each pixel, a reliability of each pixel and a solid angle of each pixel on an output format face into consideration to perform an optimization process in a unit of a pixel so that an error of information based on the light beam vectors at the pixels may be minimized.

According to a second aspect of the present invention, an image processing apparatus or image processing method for interpolating a pixel value at a point surrounded by a plurality of vertices having known pixel values in an image frame picked up by a camera including:

light beam vector calculation means for or a light beam vector calculation step of calculating light beam vectors projected at an interpolation object point and vertices surrounding the interpolation object point on a projection plane by a camera used for image pickup; and pixel value interpolation means for or a pixel value interpolation step of interpolating a pixel value of the interpolation object point using the light beam vectors at the vertices.

Usually, a pixel value or the like of a pixel other than pixels represented by integers is determined by an interpolation process by linear interpolation or the like making use of a plurality of pixels having known pixel values. In this instance, if the interpolation is performed on a projection plane of a picked up image, then it is influenced by a camera model C used or a distortion parameter of the used camera model C. In contrast, where light beam vectors are used to perform interpolation as in the image processing apparatus or image processing method according to the second aspect of the present invention, the influence of them can be excluded.

According to a third aspect of the present invention, a storage medium in or on which computer software which describes a process for pasting together a plurality of image frames picked up by different cameras so that the process may be executed on a computer system is physically stored in a computer-readable form, the computer software including:

a light beam vector calculation step of calculating a light beam vector projected at each point on a projection plane by the cameras used for image pickup based on a camera model; and an optimization step of optimizing pasting of images so that an error of information based on light beam vectors at each corresponding characteristic points between neighboring image frames may be minimized.

According to a fourth aspect of the present invention, a storage medium in or on which computer software which describes a process for interpolating a pixel value at a point surrounded by a plurality of vertices having known pixel values in an image frame picked up by a camera is physically stored in a computer-readable form, the computer software including:

a light beam vector calculation step of calculating light beam vectors projected at an interpolation object point and vertices surrounding the interpolation object point on a projection plane by a camera used for image pickup; and a pixel value interpolation step of interpolating a pixel value of the interpolation object point using the light beam vectors at the vertices.

Each of the storage media according to the third and fourth aspects of the present invention is a medium which provides computer software in a computer-readable form, for example, to a computer system for universal use which can execute various program codes. Such a medium as just mentioned is a removable and portable storage medium such as, for example, a DVD (Digital Versatile Disc), a CD (Compact Disc), an FD (Flexible Disc) or an MO (Magneto-Optical disc).

Each of the storage media according to the third and fourth aspects of the present invention defines a structural or functional cooperation relationship between predetermined computer software and the storage medium for implementing a function of the software on a computer system. In other words, by installing predetermined computer software into a computer system through the storage medium according to the third or fourth aspect of the present invention, cooperative action is exhibited on the computer system, and action and effects similar to those of the image processing apparatus or image processing method according to each of the first and second aspects of the present invention can be achieved.

According to a fifth aspect of the present invention, a computer program which describes a process for pasting together a plurality of image frames picked up by different cameras in a computer-readable form so that the process may be executed on a computer system, the computer program including:

a light beam vector calculation step of calculating a light beam vector projected at each point on a projection plane by the cameras used for image pickup based on a camera model; and an optimization step of optimizing pasting of images so that an error of information based on light beam vectors at each corresponding characteristic points between neighboring image frames may be minimized.

According to a sixth aspect of the present invention, a computer program which describes a process for interpolating a pixel value at a point surrounded by a plurality of vertices having known pixel values in an image frame picked up by a camera in a computer-readable form so that the process may be executed on a computer system, the computer program including:

a light beam vector calculation step of calculating light beam vectors projected at an interpolation object point and vertices surrounding the interpolation object point on a projection plane by a camera used for image pickup; and a pixel value interpolation step of interpolating a pixel value of the interpolation object point using the light beam vectors at the vertices.

Each of the computer programs according to the fifth and sixth aspects of the present invention defines a computer program described in a computer-readable form so that a predetermined process may be implemented on a computer system. In other words, by installing a computer program according to the third aspect of the present invention into a computer system, cooperative action is exhibited on the computer system, and action and effects similar to those of the image processing apparatus or image processing method according to each of the first and second aspects of the present invention can be achieved.

The above and other objects, features and advantages of the present invention will become apparent from the more detailed description based on the embodiment of the present invention hereinafter described and the accompanying drawings.

BRIEF DESCRIPTION OF DRAWINGS

FIG. 7 is a view illustrating a definition of a camera model of a pinhole camera;

FIG. 8 is a view illustrating the definition of the camera model of a pinhole camera;

FIG. 10 is a flow chart illustrating a processing procedure for obtaining an ImageToRay function in the Tsai's camera model;

FIG. 11 is a flowchart illustrating a processing procedure for obtaining a RayToImage function in the Tsai's camera model;

FIG. 19 is a view showing an omnidirectional image of the full celestial sphere type produced by optimizing and pasting together a plurality of image frames picked up by an omnidirectional image pickup apparatus of the full celestial image type in a unit of an image frame using a mesh camera;

FIG. 22 is a view showing an example of mapping where the surface of a regular tetrahedron is used as an output format for an omnidirectional image;

FIG. 23 is a view showing an example of mapping where the surface of a regular icosahedron is used as an output format for an omnidirectional image;

FIG. 24 is a view showing an example of mapping where the surface of a regular dodecahedron is used as an output format for an omnidirectional image; and FIG. 25 is a view showing an example of mapping where the surface of a sphere is used as an output format for an omnidirectional image.

BEST MODE FOR CARRYING OUT THE INVENTION

In the following, an embodiment of the present invention is described with reference to the drawings.

The present invention pastes together picked up images of neighboring regions in a space picked up using a plurality of cameras. The present invention can be applied, for example, to such a process of successively pasting together a plurality of images picked up by different cameras in an omnidirectional camera system formed from a plurality of cameras disposed so that an image around a certain point in a space determined as an eye point may be picked up.

In the present invention, pasting together of two images is performed using an error of information based on light beam vectors at corresponding points on a projection plane without depending upon whether or not pixel values coincide with each other between the images. Since light beam vectors are produced taking camera models and distortion parameters of the cameras also into consideration, the necessity for use of cameras having a same camera lens or a same distortion parameter is eliminated and picked up images of different camera models can be pasted together. Naturally, since images are pasted together so that an error of information based on light beam vectors between corresponding pixels may be minimized without using comparison between pixel values, there is no necessity to transform a picked up image once into a pinhole image or a like image, but the original picked up images can be pasted directly with each other. Consequently, deterioration of the pixels can be suppressed.

The error of information based on light beam vectors here signifies, for example, an angle defined by two light beam vectors or a difference or a like parameter between luminance values or between pixel values of pixels indicated by the light beam pixels.

Figure 1:
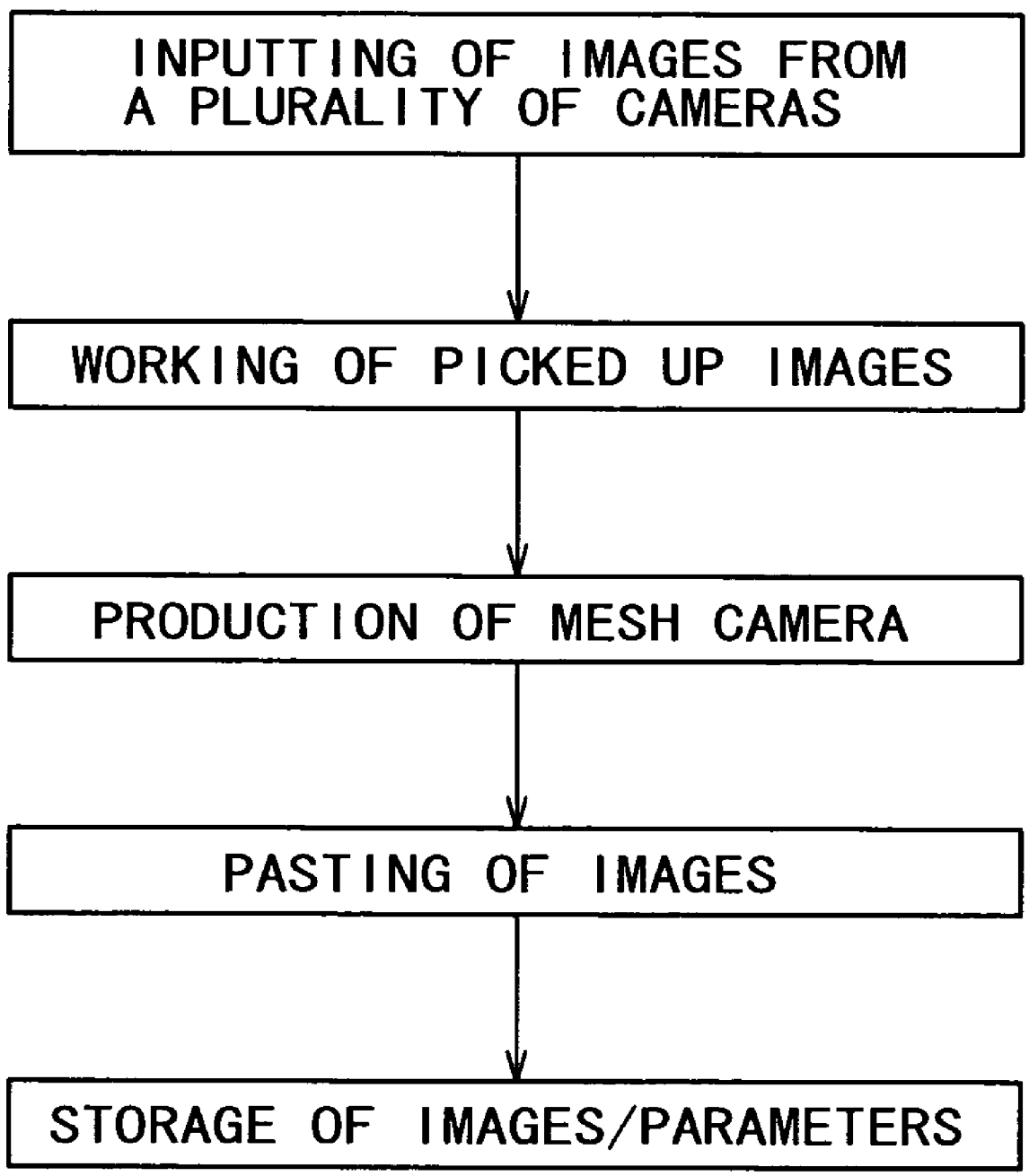
FIG. 1 is a view schematically illustrating an entire processing procedure of an image process according to the present invention.

FIG. 1 schematically illustrates an entire processing procedure of an image process according to the present invention. As shown in FIG. 1, the processing procedure includes inputting of a plurality of images from different cameras, working of the picked up images, production of a mesh camera (hereinafter described), pasting together of the images, and storage of the images. Upon the image storage, parameters used upon the pasting of the images are also stored together.

Figure 2:
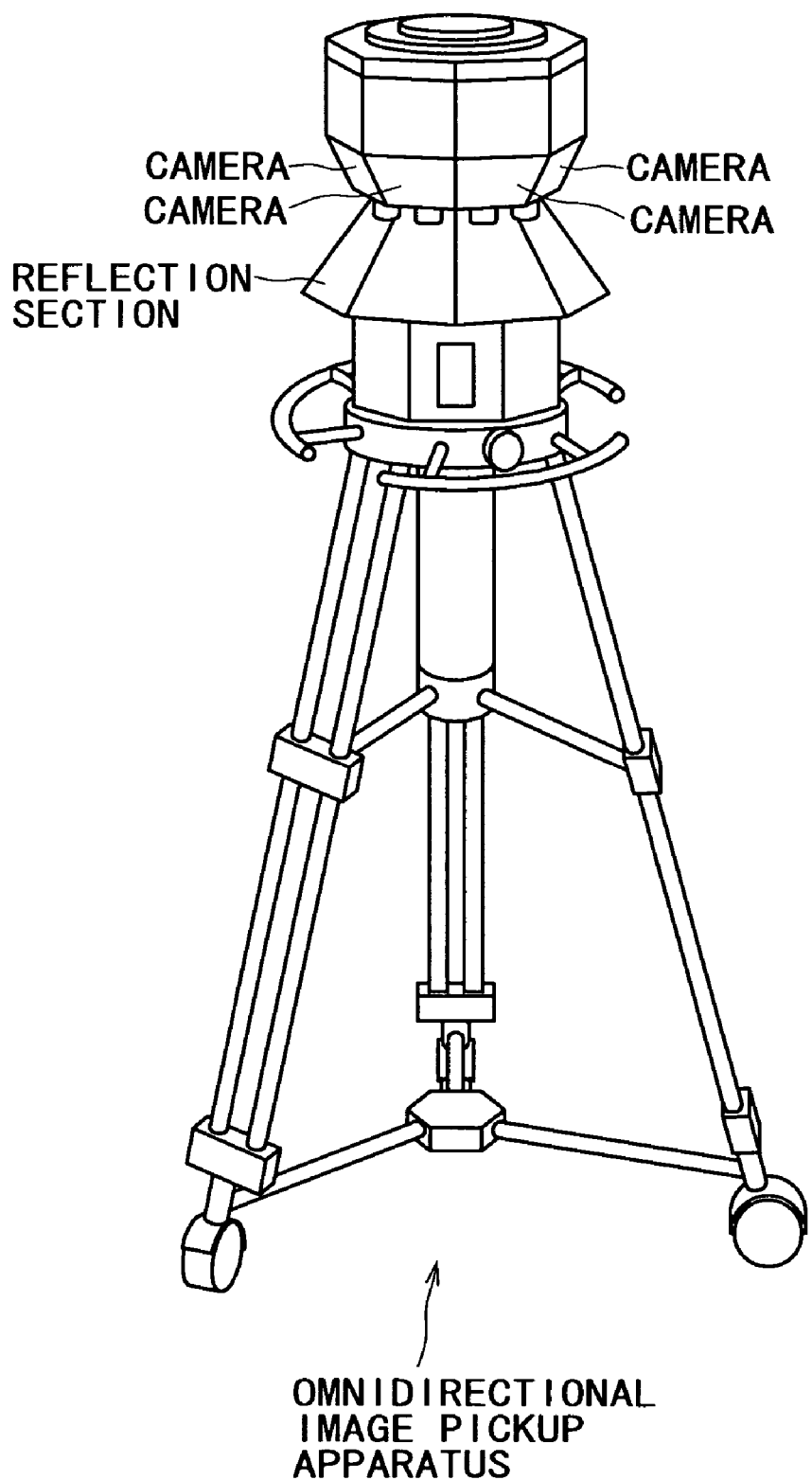
FIG. 2 is a view showing an appearance of an omnidirectional image pickup apparatus for obtaining a horizontal omnidirectional video image.

FIG. 2 shows a configuration of an appearance of an omnidirectional image pickup apparatus as a camera system which concurrently picks up images of a plurality of regions in a space.

The omnidirectional image pickup apparatus includes eight cameras disposed in a substantially equally spaced relationship from each other in a predetermined circumferential direction, and a reflection section wherein eight plane mirrors disposed individually in line-of-sight directions of the cameras are disposed on an octagonal pyramid for the individual cameras. Here, the cameras are disposed such that the projection centers thereof coincide with each other in the proximity of the center of the omnidirectional image pickup apparatus and the line-of-sight directions of the cameras are spaced from each other by a predetermined angular distance on one horizontal plane. Since an image of a surrounding scene reflected by the plane mirrors is picked up by the cameras directed in the reflecting directions, the omnidirectional image pickup apparatus can generally pick up mirror images of a video image over 360 degrees in the horizontal direction. A horizontal omnidirectional image can be obtained by performing such processes as reversal and pasting together of video images of the cameras. In the present embodiment, it is not essentially required that the cameras be of the same camera model or commonly have same parameters.

Figure 3:
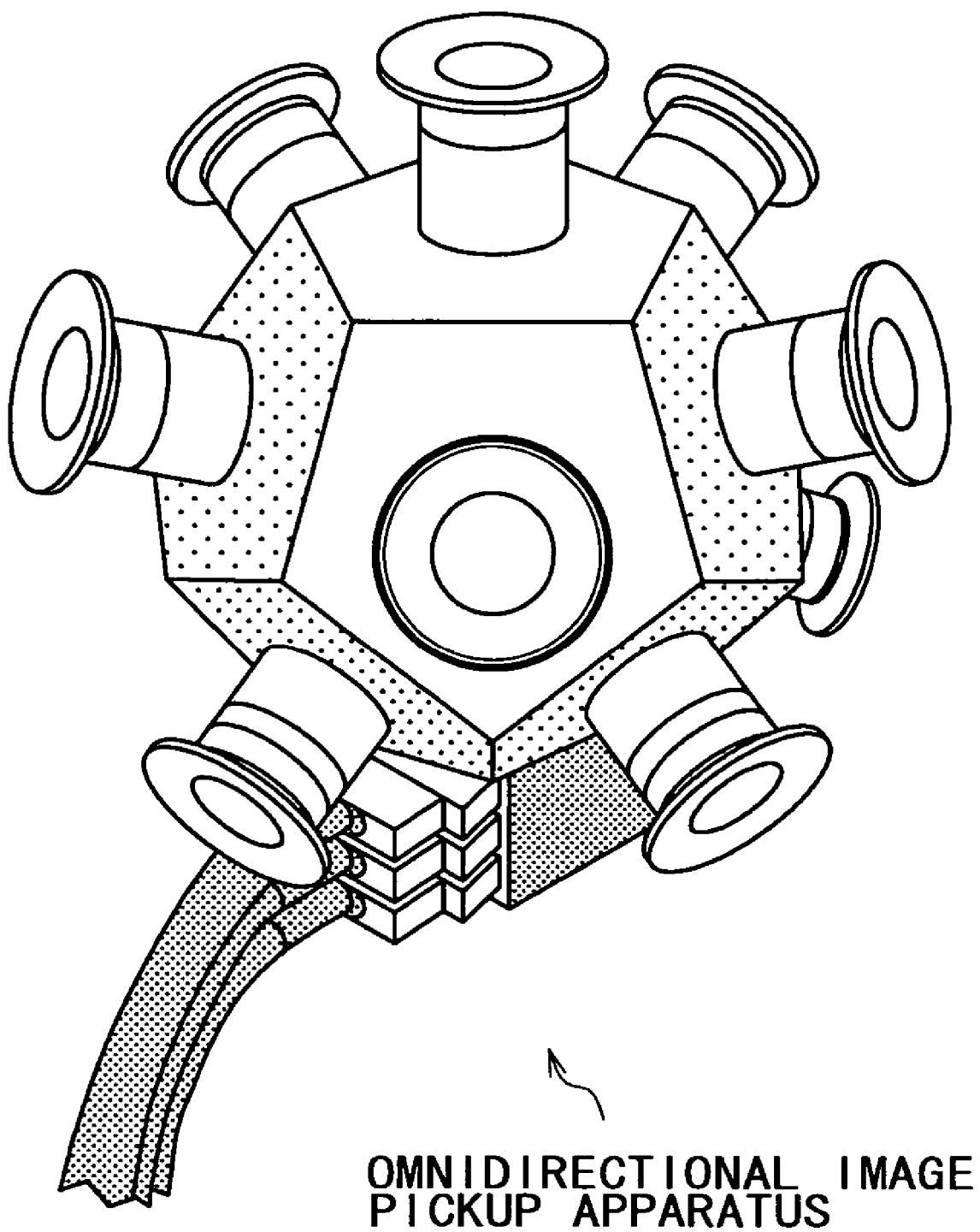
FIG. 3 is a view showing an appearance of another omnidirectional image pickup apparatus for obtaining an omnidirectional video image of the full celestial image type.

Meanwhile, FIG. 3 shows a configuration of an appearance of an omnidirectional image pickup apparatus according to another embodiment. The omnidirectional image pickup apparatus includes a frame of a shape substantially of a dodecahedron having twelve substantially regular pentagonal component faces and eleven cameras each disposed on one of the faces of the frame. Each camera can pick up an image of a region allocated thereto from within a surrounding landscape and supply the image as part of a surrounding image. Cables for outputting picked up image data by the cameras to the outside are connected to one side face of the pedestal. An omnidirectional image of the full celestial image type is obtained by pasting video images of the cameras together. Preferably, each camera is a camera of the pinhole type having a projection center, but may be of any camera model or have any distortion parameters. Naturally, all of the cameras disposed on the component faces of the dodecahedron need not have the same camera model.

Figure 4:
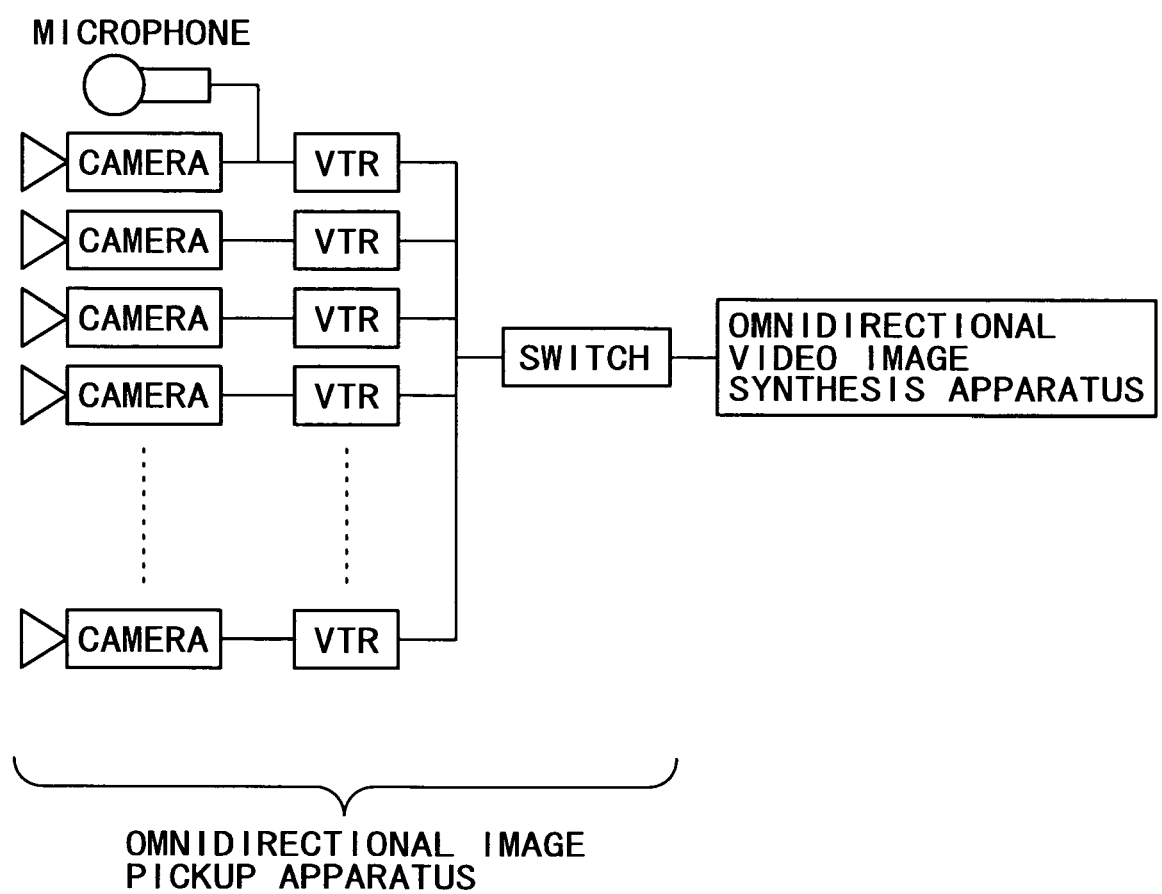
FIG. 4 is a view schematically showing a configuration of an omnidirectional image processing apparatus which processes a plurality of image frames outputted simultaneously and concurrently from an omnidirectional image pickup apparatus.

FIG. 4 schematically shows a configuration of an omnidirectional image processing apparatus which processes a plurality of image frames outputted simultaneously and concurrently from such an omnidirectional image pickup apparatus as shown in FIG. 2 or 3. Where VTRs are connected individually to the cameras as seen in FIG. 4, totaling eight video image (and audio) streams can be recorded. The thus recorded video image streams are video-captured through a switch and fetched as computer data (a bit map file) into the omnidirectional video image processing apparatus.

In the omnidirectional image processing apparatus, such image processes as working of picked up images, construction of a mesh camera, pasting together of images and storage of images are performed.

The working of a picked up image signifies such working or preprocessing as to facilitate handling of the picked up image at succeeding image processing steps. For example, in the case of such an image pickup apparatus as shown in FIG. 2, since the cameras are adapted to capture reverse images from the reflecting mirrors, the working further reverses the reverse images to regenerate original images. Further, the working quantizes such characteristics as the color, exposure and contrast. Furthermore, the working achieves improvement in the focus, particulars, end edge portions and so forth and performs removal of high frequency components and other artificial components and gamma color correction.

The mesh camera is a novel concept introduced newly by the inventors of the present invention in order to perform a pasting process of images based on the degree of coincidence between light beam vectors projected on pixels without depending upon comparison between pixel values. The mesh camera is formed from a corresponding relationship between vertices (x, y) of innumerable polygons into which the projection plane of a camera is divided and light beam vectors (represented by a $\theta\phi$ polar coordinate system) corresponding to the vertices (x, y). The mesh camera has a configuration different among different camera models (each of the camera models in this instance may be handled including a distortion parameter of the camera). A particular construction method of the mesh camera is hereinafter described.

It is to be noted that, in the mesh camera, the relationship between a position (x, y) on the projection plane and a corresponding light beam vector ($\theta$, $\phi$) is not defined with regard to any other point of a polygon than the vertices. A point other than the vertices is obtained by an interpolation process using the vertices of the polygon which includes the point (hereinafter described).

A process of pasting neighboring images together is performed depending upon whether or not a plurality of characteristic points extracted from image frames manually or automatically correspond to each other. For example, Japanese Patent Laid-Open No. 2000-215317 assigned already to the applicant of the present invention discloses an image processing method and an image processing apparatus wherein corresponding characteristic points are automatically extracted from within two image frames which overlap with each other. In particular, the image processing apparatus 10 extracts characteristic points from within two or more images, and compares the characteristic points of one of the images and another one of the images to perform matching between them. Then, the image processing apparatus 10 performs arithmetic operation based on a result of the matching so that the positional relationship between the one image and the above-mentioned another one image may be changed, and synthesizes the two or more images.

Conventionally, comparison of a characteristic point between image frames is performed usually based on pixel values. In contrast, the present invention is characterized in that a mesh camera is used to determine light beam vectors at characteristic points and images are successively pasted together so that an error of information based on such light beam vectors may be minimized between corresponding points. Here, the error of information based on light beam vectors represents, for example, an angle defined between two light beam vectors or signifies a difference between luminance or pixel values of pixels indicated by the light beam vectors.

Where characteristic points are compared with regard to pixel values on a projection plane of a picked up image, there is no meaning if the influence of a distortion parameter of the camera is not removed. Further, where different camera models are involved, it is difficult even to compare images with each other. In contrast, according to the present invention, since characteristic points are compared with each other in terms of light beam vectors, a three-dimensional positional relationship between images can be restored, and this is not influenced by a difference in camera model. Further, the influence of a distortion parameter can be removed by constructing a mesh camera taking the influence of a distortion parameter into consideration.

Figure 5:
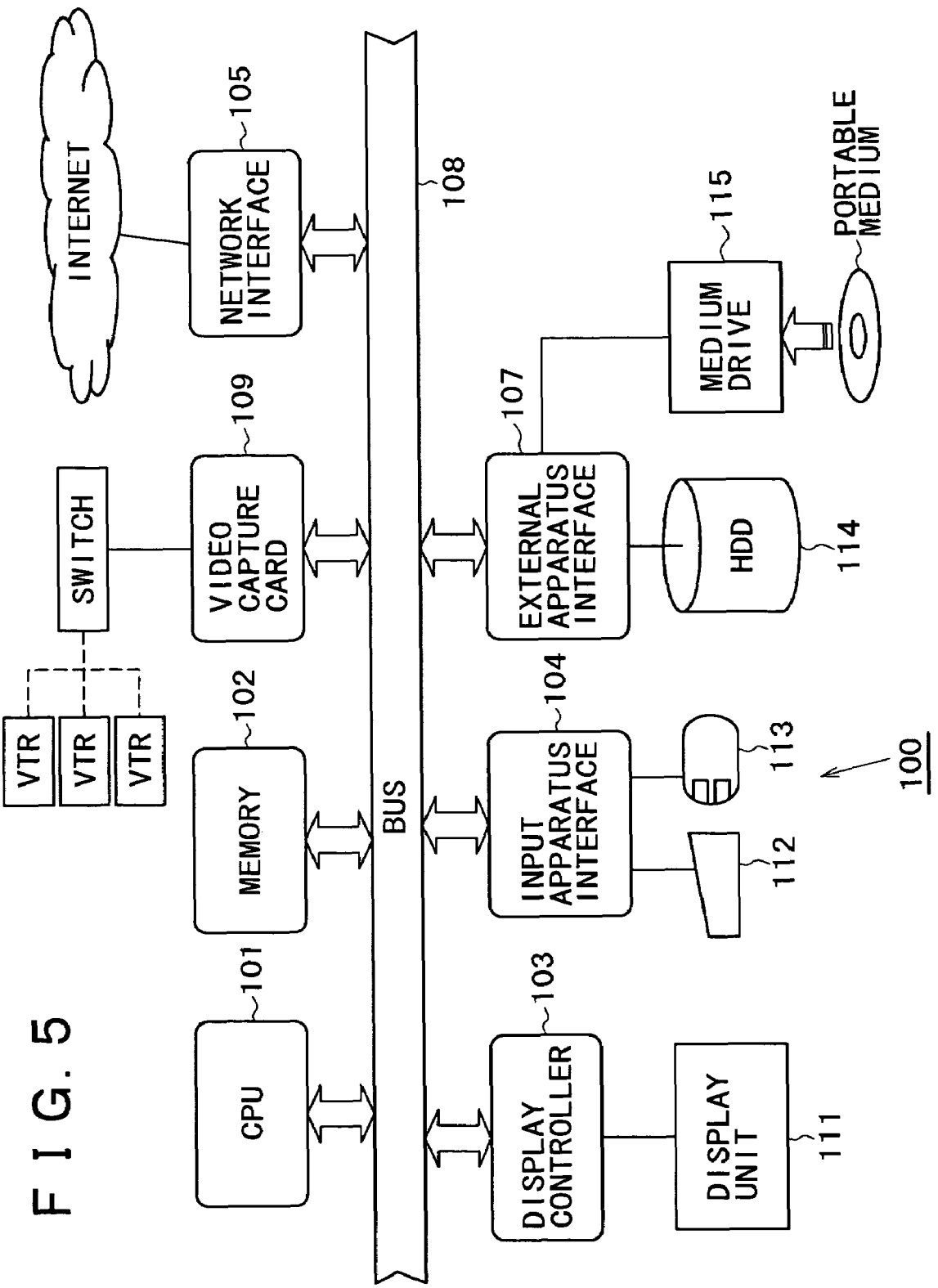
FIG. 5 is a view schematically showing a configuration of a computer system 100 applied as an omnidirectional image processing apparatus.

FIG. 5 schematically shows a configuration of the computer system 100 applied as the omnidirectional image processing apparatus. In the following, the computer system 100 is described with reference to FIG. 5.

A CPU (Central Processing Unit) 101 which is a main controller of the system 100 executes various applications under the control of an operating system (OS). The CPU 101 can execute an application program for performing an image process such as, for example, production of a mesh camera based on a camera model or lens distortion of each camera and an optimization process of image pasting using the mesh camera in order to perform pasting together of a plurality of picked up images from different cameras. As seen in FIG. 5, the CPU 101 is interconnected to other apparatus (hereinafter described) by a bus 108.

A memory 102 is a storage device used to store program codes to be executed by the CPU 101 and temporarily store work data during such execution. It should be understood that the memory 102 shown in FIG. 5 includes both of a nonvolatile memory such as a ROM and a volatile memory such as a DRAM.

A display controller 103 is a controller for exclusive use for actual processing of a plotting instruction issued from the CPU 101. Plotting data processed by the display controller 103 is written into, for example, a frame buffer (not shown) once and then outputted on a screen by a display unit 111.

An input apparatus interface 104 is an apparatus for connecting user inputting apparatus such as a keyboard 112 and a mouse 113 to the computer system 100.

A network interface 105 can connect the system 100 to a local network such as a LAN (Local Area Network) and further to a wide area network such as the Internet in accordance with a predetermined communication protocol such as the Ethernet (registered trademark).

On the network, a plurality of host terminals (not shown) are connected in a transparent state to construct a distributed computing environment. On the network, a distribution service of a software program, data contents and so forth can be performed. For example, an application program for performing an image process such as, for example, production of a mesh camera based on a camera model or lens distortion of each camera and an optimization process of image pasting using the mesh camera in order to perform pasting together of a plurality of picked up images from different cameras can be downloaded through the network. Also it is possible to distribute image data of an omnidirectional image produced by such an image processing application as described above, data regarding a mesh camera to be used for an optimization process and other libraries through the network.

An external apparatus interface 107 is an apparatus for connecting an external apparatus such as a hard disk drive (HDD) 114 or a medium drive 115 to the system 100.

The HDD 114 is an external storage apparatus (well known in the art) in which a magnetic disk as a storage carrier is incorporated fixedly, and is superior in the storage capacity, transfer rate and so forth to the other external storage apparatus. To place a software program onto the HDD 114 in an executable state is called "install" of the program into the system. Usually, program codes of an operating system to be executed by the CPU 101, application programs, device drivers and so forth are stored in a nonvolatile fashion on the HDD 114.

For example, an application program for performing an image process such as, for example, production of a mesh camera based on a camera model or lens distortion of each camera and an optimization process of image pasting using the mesh camera in order to perform pasting together of a plurality of picked up images from different cameras can be installed onto the HDD 114. Also it is possible to store picked up images which make a processing object of such an image processing application as described above, images pasted together on a predetermined output format, data regarding a mesh camera to be used for an optimization process and other libraries onto the HDD 114.

The medium drive 115 is an apparatus for being loaded with a portable medium such as a CD (Compact Disk), an MO (Magneto-Optical disk) or a DVD (Digital Versatile Disk) and accessing a data recording face of the portable medium.

The portable medium is used principally in order to back up a software program, a data file or the like as data of the computer-readable type and move such data between different systems (the movement includes sales, circulation and distribution). For example, an application for performing an image process such as, for example, production of a mesh camera based on a camera model or lens distortion of each camera and an optimization process of image pasting using the mesh camera in order to perform pasting together of a plurality of picked up images from different cameras can be physically circulated or distributed between a plurality of apparatus making use of such portable media as mentioned above. Also picked up images which make a processing object of such an image processing application as just described, images pasted together on a predetermined output format, data regarding a mesh camera to be used for an optimization process and other libraries can be physically circulated or distributed between a plurality of apparatus making use of such portable media as mentioned above.

A video capture card 109 is an apparatus for fetching input signals from the omnidirectional image pickup apparatus 11, that is, video signals reproduced from the VTRs connected through the switch, as computer data (a bit map file) into the computer.

It is to be noted that an example of such a computer system 100 as shown in FIG. 5 is a compatible machine or a succeeding machine of the personal computer "PC/AT (Personal Computer/Advanced Technology)" of IBM of the United States. Naturally, another computer having different architecture can be applied as the computer 100 according to the present embodiment.

Construction of a Mesh Camera

A mesh camera is a concept introduced newly in the present invention in order to perform an optimization process for image pasting depending upon the degree of coincidence of light beam vectors projected on pixels based on a three-dimensional positional relationship of images. The mesh camera is composed of a corresponding relationship between vertices (x, y) of numerous polygons into which a projection plane of a camera is divided and light beam vectors (represented by a $\theta\phi$ polar coordinate system) corresponding to the vertices (x, y).

Figure 6:
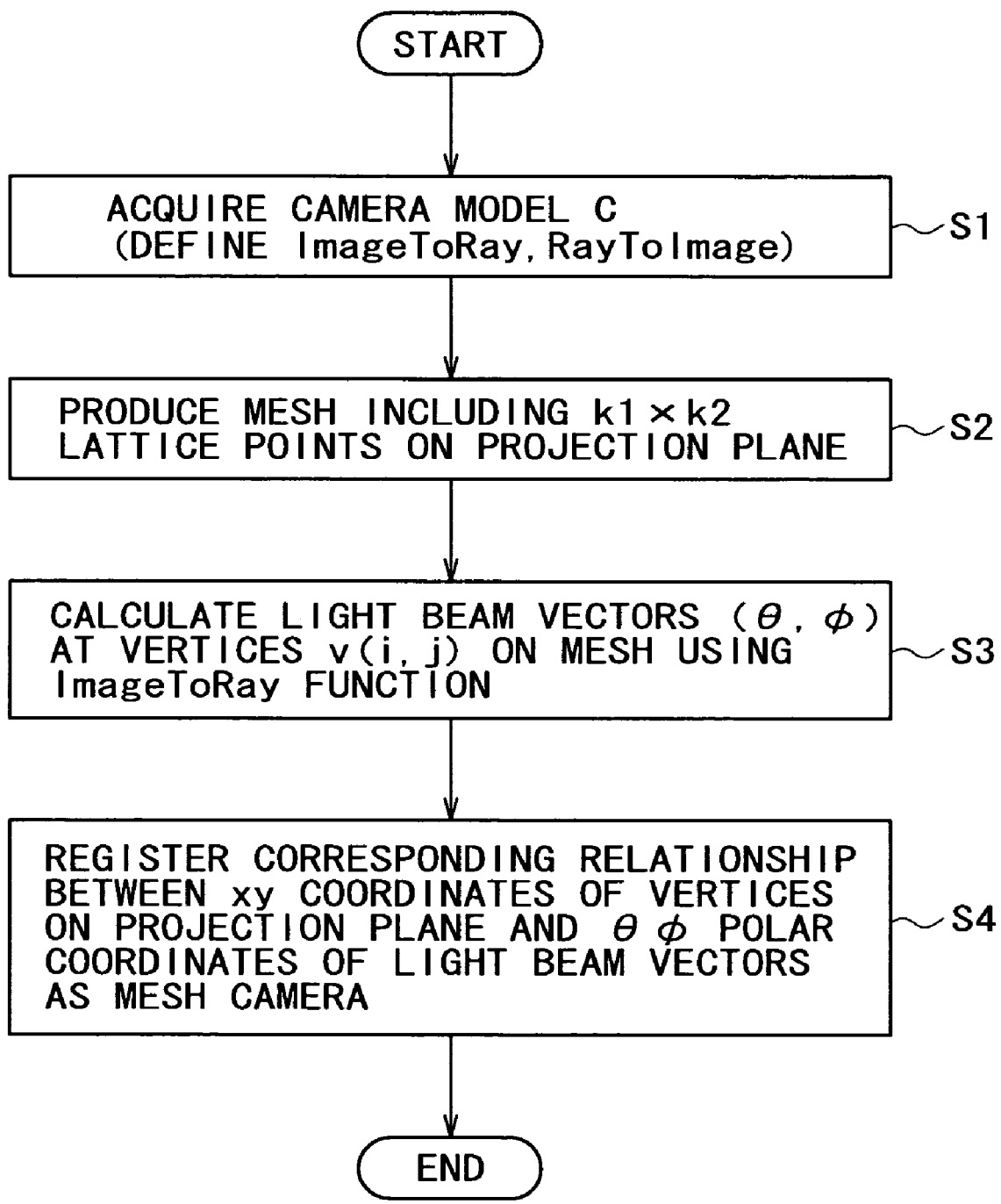
FIG. 6 is a flow chart illustrating a processing procedure for producing a mesh camera.

FIG. 6 illustrates a processing procedure for producing a mesh camera in the form of a flow chart.

First at step S1, a camera model C is acquired. A definition of the camera model C is to define an ImageToRay function for determining a light beam vector (represented by a $\theta\phi$ polar coordinate system) projected at a point (x, y) on a projection plane and a RayToImage function for determining the position (x, y) projected on the projection plane from the light beam vector $\theta\phi$.

Then at step S2, polygons formed from k1×k2 lattice points are produced on the projection plane of the camera. As a result, 2(k1−1)×(k2−1) triangles and k1×k2 vertices are produced.

Then at step S3, for each of the vertices (i, j), a corresponding light beam vector ($\theta$, $\phi$) is successively calculated using the ImageToRay function.

Then at step S4, data (x, y, $\theta$, $\phi$) which describe the corresponding relationship between the individual vertices (x, y) on the projection plane of the camera and the light beam vectors ($\theta$, $\phi$) described in the $\theta\phi$ polar coordinate system are produced. The (x, y)$\Leftrightarrow$($\theta$, $\phi$) corresponding table produced in this manner serves as a mesh camera.

Where the mesh camera is used, a light beam vector at an arbitrary point on the projection plane of the camera can be determined at a comparatively high speed. In particular, through use of the mesh camera, corresponding points between two image frames can be determined from an error of information based on light beam vectors. The error of information based on light beam vectors represents, for example, an angle defined between two light beam vectors or signifies a difference between luminance or pixel values of pixels indicated by the individual light beam vectors.

The mesh camera has a different configuration among different camera models. Definition of mesh cameras allows pasting together of picked up images among a great number of different camera systems.

The mesh camera can be calculated using the ImageToRay and RayToImage functions which are a definition of the camera model C. In the following, the ImageToRay function and the RayToImage function of several camera models are described.

Pinhole Camera

Since the pinhole camera has a basic principle of central projection, the following expression is satisfied between a point (x, y, f) on a focal plane (where the focal distance is f) and a corresponding point (X, Y, Z) on an arbitrary projection plane. It is to be noted that the center of projection is defined as the origin O (refer to FIG. 7).

$$\frac{x}{X} = \frac{y}{Y} = \frac{f}{Z} \qquad (1)$$

Meanwhile, where a light beam vector from the center of projection toward the point (x, y, f) is represented in the θφ polar coordinate system, θ and φ can be written as given by the following expression (refer to FIG. 8)

$$\theta = \arctan\left(\frac{X}{Z}\right) \qquad (2)$$

$$\phi = \arctan\left(\frac{Y}{\sqrt{X^2 + Z^2}}\right)$$

Accordingly, for the pinhole camera, the ImageToRay function for determining a light beam vector projected at the point (x, y) on the projection plane and the RayToImage function for determining the position (x, y) projected on the projection plane from the light beam vector θφ are written as given by the following expressions:

ImageToRay(x, y, C)=(0, θ, φ)

RayToImage(θ, φ, C)=(x, y)

Fisheye Lens

Figure 9:
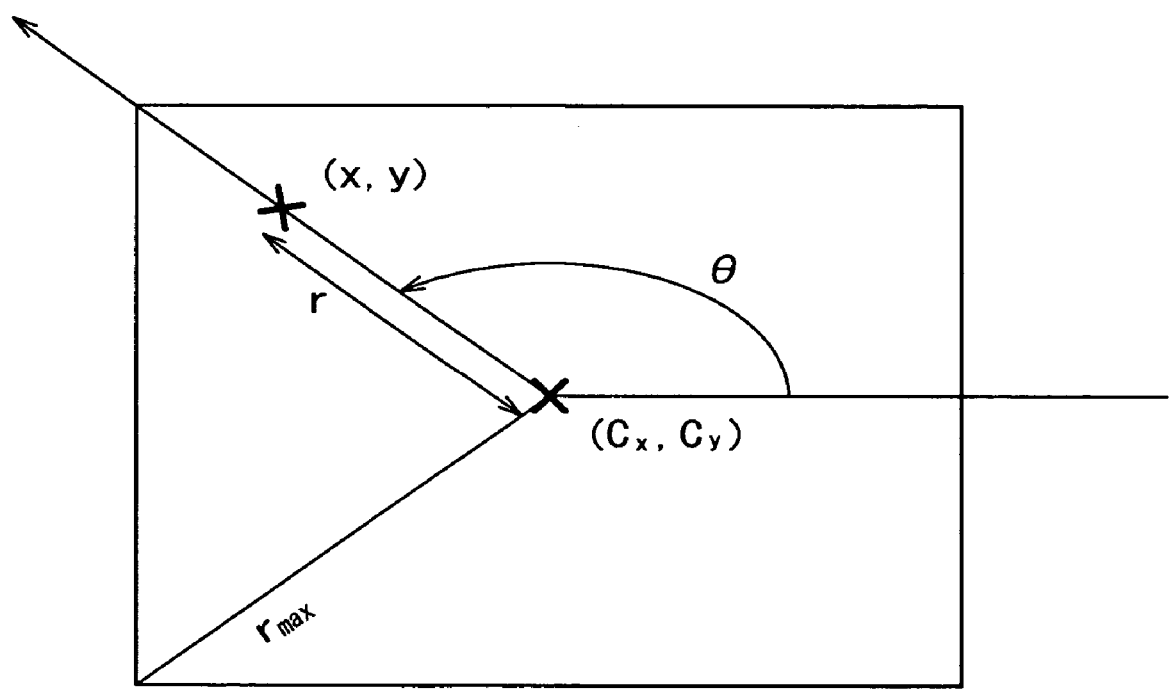
FIG. 9 is a view illustrating a definition of a camera model of a fisheye lens.

In the case of a fisheye lens, if a function F(r) of r is defined where the center of the lens is represented by ($C_x$, $C_y$) and the distance between a point (x, y) on a projection plane and the center of the lens is represented by r (refer to FIG. 9), then the ImageToRay function for determining a light beam vector projected at the point (x, y) on the projection plane and the RayToImage function for determining the position (x, y) projected on the projection plane from the light beam vector θφ are represented individually as given by the following expressions:

$$ImageToRay(x, y, C) = \left(0, \arctan\frac{y - c_y}{x - c_x} F((x - c_x)^2 + (y - c_y)^2)\right)$$

$$RayToImage(\theta, \phi, C) = (c_x + F^{-1}(\phi)\cos\theta, c_y + F^{-1}(\phi)\sin\theta)$$

$$\text{where } F^{-1}(\phi) = \frac{2r_{\max}}{f_{ov}} \phi \qquad (4)$$

($f_{ov}$: field of view (angular field of view))

Here, the function F is defined as given by the following expression:

$$F(r) = \frac{f_{ov}}{2} \times \frac{r}{r_{\max}} \qquad (5)$$

where $$\frac{f_{ov}}{2}$$

is a radius of the angular field of view.

Tsai's Camera Model

The Tsai's camera model includes a lens with lens distortion taken into consideration, and allows simultaneous calculation of all camera parameters, that is, an internal parameter, an external parameter and a distortion parameter (refer to, for example, to a paper by Roger Y. Tsai, "An Efficient and Accurate Camera Calibration Technique for 3D Machine Vision", IEEE, 1986.

The Tsai's camera model is defined by the central portion ($C_x$, $C_y$) of the lens, the aspect ratio $a_y$ of the projection plane and the distortion coefficient κ in a radial direction. In contrast, the camera model of an ideal pinhole camera having no distortion is defined by the principal point ($p_x$, $p_y$) and the focus position ($f_x$, $f_y$) in the X and Y axis directions.

FIG. 10 illustrates a processing procedure for determining the ImageToRay function for the Tsai's camera model in the form of a flow chart.

First, a relationship between a point projected through an ideal pinhole on the projection plane and a point (x, y) projected with the Tsai lens is determined (step S11). It is to be noted that, at this step, although corresponding coordinates on the pinhole image are calculated from a point on the projection plane of the Tsai's model, since image transform into a pinhole image is not performed, the image does not suffer from any deterioration in picture quality.

$$\tilde{x} = x + (x - c_x)\kappa r^2$$

$$\tilde{y} = y + (y - c_y)\kappa r^2 \qquad (6)$$

where $r^2 = (x - c_x)^2 + \{(y - c_y)a_y\}^2$

Then, a light beam vector $P_{\theta,\phi}$ is set on a three-dimensional unit sphere (step S12). If the light beam vector $P_{\theta,\phi}$ of the three-dimensional θφ polar coordinate system is represented in the XYZ rectangular coordinate system and the homogeneous coordinates, then they are given by the following expressions:

$$P_{\theta,\phi} \cong K \begin{pmatrix} \tilde{x} \\ \tilde{y} \\ 1 \end{pmatrix} \qquad (7)$$

$$P_{\theta,\phi} = \begin{pmatrix} P_{\theta,\phi}\langle x \rangle \\ P_{\theta,\phi}\langle y \rangle \\ P_{\theta,\phi}\langle z \rangle \end{pmatrix}$$

Then, a light beam vector at the point (x, y) on the projection plane according to the Tsai's camera model can be represented in the θφ polar coordinate system based on the point $P_{\theta,\phi}$ (step S13)

$$\phi = \arcsin P_{\theta,\phi}\langle y \rangle \qquad (8)$$

$$\theta = \arccos \frac{P_{\theta,\phi}\langle z \rangle}{\cos\phi}$$

Further, FIG. 11 illustrates a processing procedure for determining the RayToImage function for the Tsai's camera model in the form of a flow chart.

First, polar coordinate values (θ, φ) of a light beam vector on a unit sphere are transformed into a position $P_{\theta,\phi}$ on the three-dimensional orthogonal coordinate system (step S21).

$$P_{\theta,\phi} = \begin{pmatrix} \sin\theta\cos\phi \\ \sin\phi \\ \cos\theta\cos\phi \end{pmatrix} \quad (9)$$

Then, the light beam vector $P_{\theta,\phi}$ is transformed into ideal pinhole coordinate values as given by the following expressions (step S22):

$$(\tilde{x}, \tilde{y}) \cong KP_{\theta,\phi} \quad (10)$$

$$K = \begin{bmatrix} f_x & 0 & P_x \\ 0 & f_y & P_y \\ 0 & 0 & 1 \end{bmatrix}$$

where $$f_x = \frac{\text{width}}{2\tan\frac{hf_{ov}}{2}}$$

(width: width of the image frame, $hf_{ov}$: angular field of view in the horizontal direction)

$$f_y = \frac{\text{height}}{2\tan\frac{vf_{ov}}{2}}$$

(height: height of the image frame, $vf_{ov}$: angular field of view in the vertical direction)

Then, a predetermined multidimensional equation is solved to calculate the coordinates (x, y) of the original image of the Tsai's model from the point on the ideal pinhole image (step S23). It is to be noted that, at this step, although a corresponding point on the projection plane of the Tsai's model is calculated from the coordinate position on the pinhole image, since image transformation from the pinhole image is not involved, the image does not suffer from any deterioration in picture quality.

$$\tilde{r} = \sqrt{(\tilde{x}-c_x)^2 + (\tilde{y}-c_y)^2} \quad (11)$$

This corresponds to solution of the following multidimensional equation:

$$\kappa r^3 + r - \tilde{r} = 0 \quad (12)$$

Where the multidimensional equation exhibits a plurality of solutions, a solution nearer to an ideal radius is selected. A selected solution is given by the following expressions.

It is to be noted that, while the expression (12) given above includes a single distortion parameter of $\kappa$, where the used camera has a plurality of kinds of distortion, the quantity of distortion parameters may be increased and a higher order equation may be employed:

$$x = \frac{\tilde{x} - c_x \kappa r'^2}{1 + \kappa r'^2} \quad (13)$$

$$x = \frac{\tilde{y} - c_y \kappa r'^2}{1 + \kappa r'^2}$$

Transfer Function $W_T$

According to the mesh camera described above, for each of the vertex positions (x, y) of numerous polygons set on the projection plane of the camera model C, it is possible to determine a vector $(\theta, \phi)$ of a light beam projecting at the position or to determine a projection position (x, y) on the projection plane if a light beam vector $\theta\phi$ of the camera model C is given. In other words, the mesh camera is a correspondence table between the projection positions (x, y) and the light vectors $(\theta, \phi)$.

However, since the mesh camera does not have data other than the vertices of the polygons, in most cases wherein a characteristic point is extracted other than a vertex, it is impossible to determine a light beam vector directly from the mesh camera. In such an instance, light beam vectors at the vertices of the polygons including the characteristic point are used to perform a geometrical interpolation process for light beam vectors with regard to internal points of the polygons.

Figure 12:
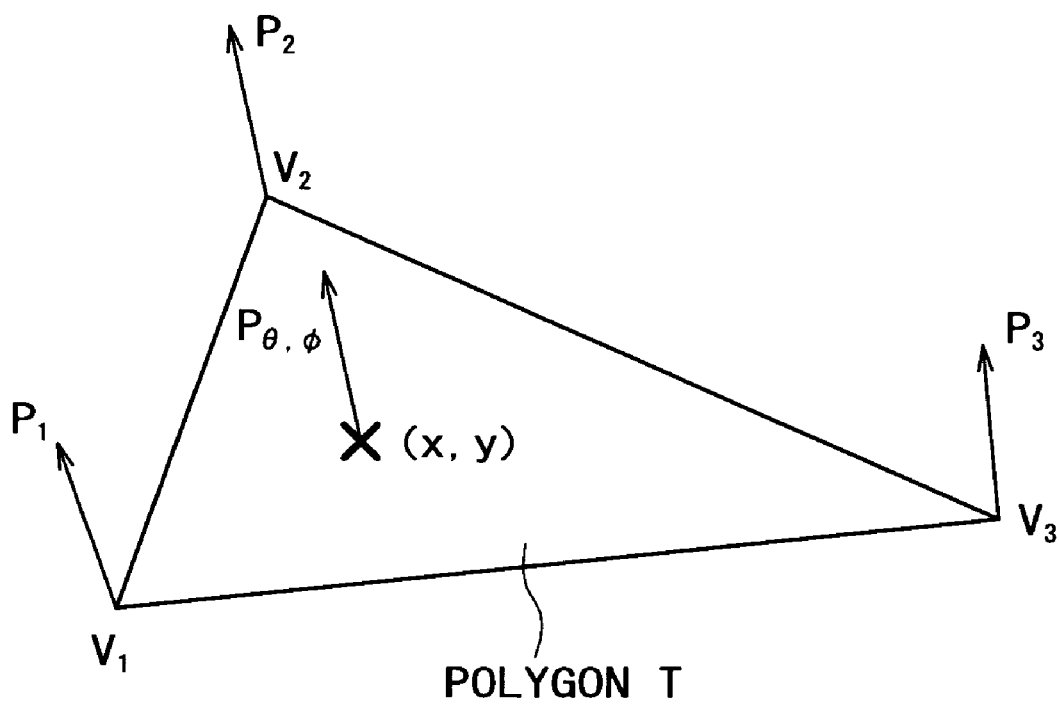
FIG. 12 is a view illustrating a method of calculating a transform function WT.

For example, it is assumed that a characteristic point (x, y) is included in a polygon T which has three vertices $V_1(x_1, y_1)$, $V_2(x_2, y_2)$ and $V_3(x_3, y_3)$ as seen in FIG. 12 (that is, $(x, y) \in T$)

Here, light beam vectors at the vertices $V_1$, $V_2$ and $V_3$ defined by the mesh camera are represented by $P_1(X_1, Y_1, Z_1)$, $P_2(X_2, Y_2, Z_2)$ and $P_3(X_3, Y_3, Z_3)$ in the three-dimensional XYZ rectangular coordinate system. It is assumed, however, that $P_1$, $P_2$ and $P_3$ are normalized unit vectors. Further, it is assumed that a transform function $W_T$ which can transform the light beam vectors $P_1$, $P_2$ and $P_3$ into XY coordinates of the vertices $V_1$, $V_2$ and $V_3$ is satisfied approximately. In particular, $$\begin{pmatrix} x_1 \\ y_1 \\ 1 \end{pmatrix} = W_T \begin{pmatrix} X_1 \\ Y_1 \\ Z_1 \end{pmatrix}, \begin{pmatrix} x_2 \\ y_2 \\ 1 \end{pmatrix} = W_T \begin{pmatrix} X_2 \\ Y_2 \\ Z_2 \end{pmatrix}, \begin{pmatrix} x_3 \\ y_3 \\ 1 \end{pmatrix} = W_T \begin{pmatrix} X_3 \\ Y_3 \\ Z_3 \end{pmatrix} \quad (14)$$

In such an instance, if the expressions are added, then the following expression is obtained:

$$\begin{pmatrix} x_1 & x_2 & x_3 \\ y_1 & y_2 & y_3 \\ 1 & 1 & 1 \end{pmatrix} = W_T \begin{pmatrix} X_1 & X_2 & X_3 \\ Y_1 & Y_2 & Y_3 \\ Z_1 & Z_2 & Z_3 \end{pmatrix} \quad (15)$$

where $W_T$ is a transform function which approximately transforms all points $(x, y) (\in T)$ which belongs to the polygon T from the light beam vector $P_{\theta,\phi}$. The transform function $W_T$ can be determined, for example, in accordance with the following expression:

$$W_T = \begin{pmatrix} x_1 & x_2 & x_3 \\ y_1 & y_2 & y_3 \\ 1 & 1 & 1 \end{pmatrix} \begin{pmatrix} X_1 & X_2 & X_3 \\ Y_1 & Y_2 & Y_3 \\ Z_1 & Z_2 & Z_3 \end{pmatrix}^{-1} \quad (16)$$

Meanwhile, the light beam vector $P_{\theta,\phi}$ at the point (x, y) in the polygon T can be determined in accordance with the following expression:

$$\begin{pmatrix} X \\ Y \\ 1 \end{pmatrix} = W_T P_{\theta,\phi} \text{ where } P_{\phi,\phi} = \begin{pmatrix} \sin\theta\cos\phi \\ \sin\phi \\ \cos\theta\cos\phi \end{pmatrix} \quad (17)$$

Pasting Together (Registration) of Images

The mesh camera determined in such a manner as described above is used to perform pasting together of images.

Pasting together of images involves extraction of a plurality of characteristic points from each of two image frames to be pasted together and an optimization process (Optimization) performed so that errors of information of corresponding characteristic points based on light beam vectors may be minimized. An error of information based on light beam vectors here represents, for example, an angle defined by two light beam vectors or signifies a difference between luminance or pixel values of pixels indicated by the light beam vectors.

Meanwhile, the optimization process includes the following three stages of optimization:

(i) first optimization performed in a unit of an image frame while the light beam vectors obtained from the characteristic points are fixed;

(ii) second optimization performed in a unit of a polygon while the light beam vectors, that is, the transform function $W_T$, is varied; and (iii) third optimization performed in a unit of a pixel with an output format after the image pasting taken into consideration.

First, a principle of optimization is described briefly.

Figure 13:
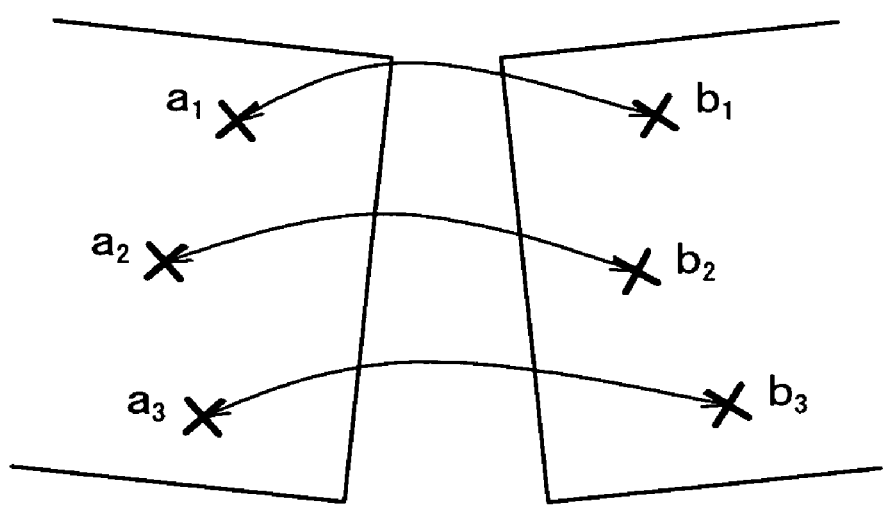
FIG. 13 is a view illustrating a principle of an optimization process for image pasting.
Figure 14:
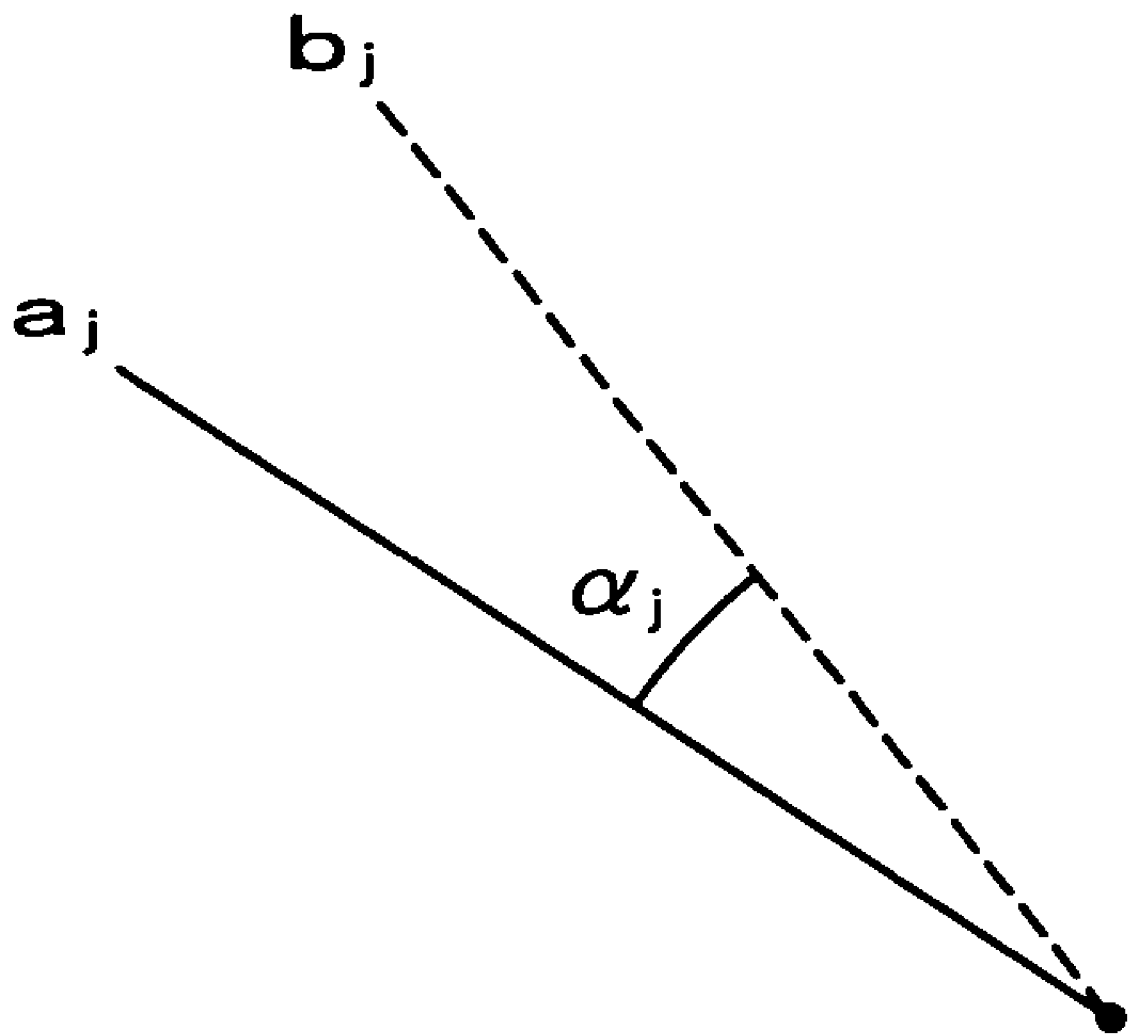
FIG. 14 is a view illustrating the principle of the optimization process for image pasting.

For example, it is assumed that, as shown in FIG. 13, image frames $I_A$ and $I_B$ are present which neighbor with each other in a predetermined image pickup space, and a plurality of characteristic points $a_1, a_2, \ldots$ and $b_1, b_2, \ldots$ are obtained from the image frames $I_A$ and $I_B$, respectively. Here, for the convenience of description, it is assumed that the characteristic points $a_1, a_2, \ldots$ and $b_1, b_2, \ldots$ are not xy two-dimensional rectangular coordinates on an image frame but light beam vectors at the characteristic points. Further, it is assumed that each two characteristic points $a_j$ and $b_j$ having the same suffix correspond to each other.

Where the angle defined by the light beam vectors $a_j$ and $b_j$ is represented by $\alpha_j$, $\alpha_j$ has a magnitude corresponding to the error between the light beam vectors $a_j$ and $b_j$ (refer to FIG. 14). For example, where the characteristic points $a_j$ and $b_j$ coincide accurately with each other, $\alpha_j$ is 0.

$\alpha_j$ can be calculated in accordance with the following expression:

$$\alpha_j = \arccos \frac{a_j \cdot b_j}{\|a_j\| \|b_j\|} \quad (18)$$

Accordingly, an optimization process is to use the expression above as an evaluation function and collate the images so that $\alpha_j$ may be minimized.

Further, where $f_j$ characteristic points are set or inputted between the neighboring image frames $I_A$ and $I_B$, an optimization process is to collate the image frames $I_A$ and $I_B$ so that the sum total of $\alpha_j$ determined for the individual characteristic points may be minimized. In the following expression, a root-mean-square value is used as an evaluation function in order to eliminate an influence of the positive and negative signs.

$$\frac{1}{f_j} \sum_{j=1}^{f_j} (\alpha_j)^2 \quad (19)$$

Figure 15:
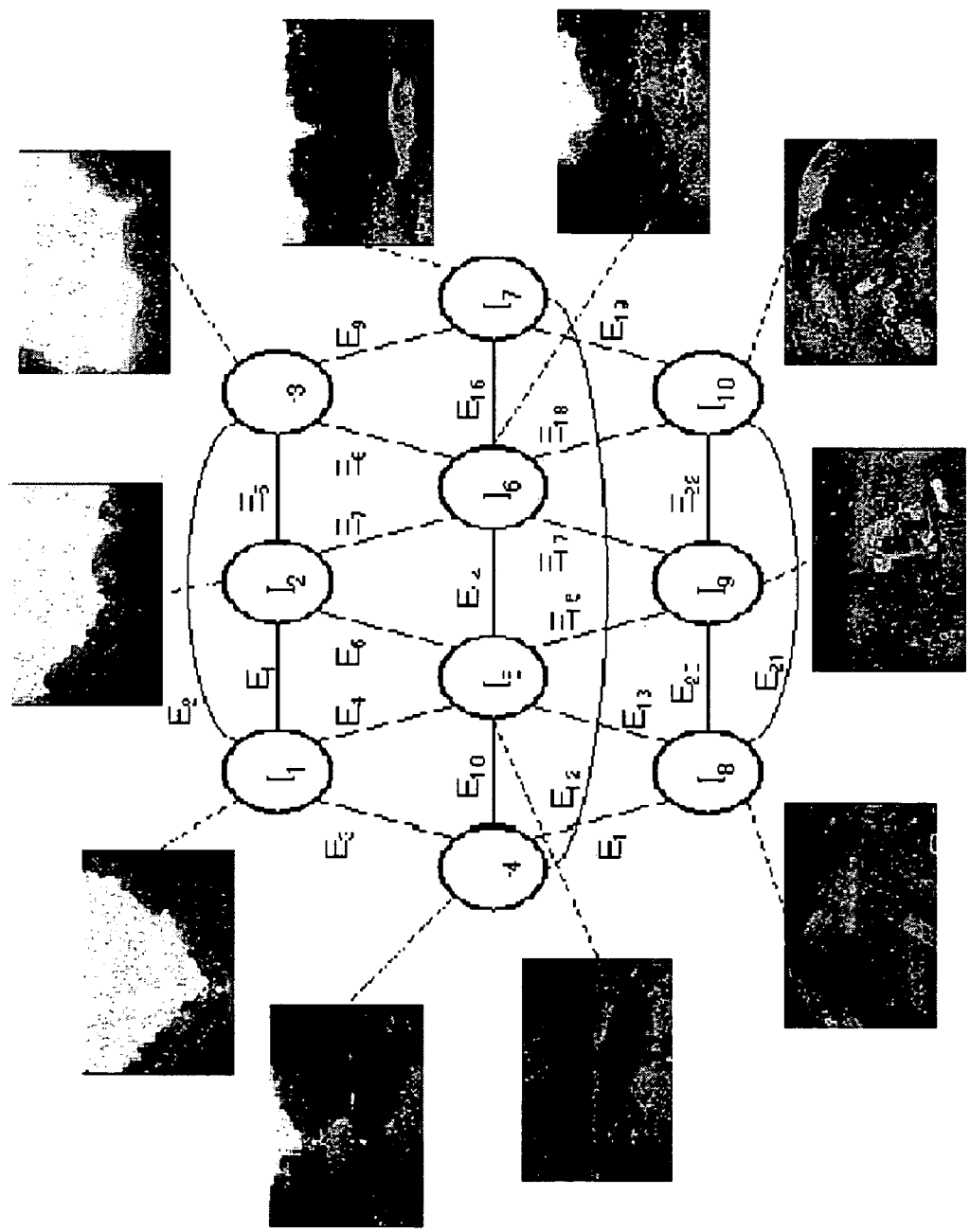
FIG. 15 is a view illustrating a neighboring relationship among picked up image frames by an image pickup apparatus for an omnidirectional image.

Further, an actual omnidirectional image pickup apparatus includes three or more cameras, that is, three or more image frames, and each of the image frames has a neighboring image frame for each side thereof. FIG. 15 illustrates a neighboring relationship among picked up image frames $I_1$, $I_2, \ldots, I_{10}$ of different cameras in an omnidirectional image pickup apparatus which includes 10 cameras $C_1, C_2, \ldots, C_{10}$.

Referring to FIG. 15, each two image frames which are tied with each other by a solid line have a neighboring relationship with each other. For example, the picked up image frame $I_1$ of the camera $C_1$ neighbors with the picked up image frame $I_2$ of the camera $C_2$, the picked up image frame $I_3$ of the camera $C_3$, the picked up image frame $I_4$ of the camera $C_4$, and the picked up image frame $I_5$ of the camera $C_5$. Accordingly, in order to produce an omnidirectional image, it is necessary to perform an optimization process of image collation of the image frame $I_1$ with the other four neighboring image frames $I_2, I_3, I_4$ and $I_5$. Naturally, also for the picked up image frames $I_2, \ldots$ of the other cameras $C_2, \ldots$, it is necessary to perform an optimization process with all neighboring image frames.

Here, an image I is formed from n image frames $\{I_1, \ldots, I_n\}$ and where it is necessary to perform collation of the image I on m boundaries $E = \{E_1, \ldots, E_m\}$ and collation is performed at $f_j$ characteristic points on each boundary ${}^iE$ (${}^iE = \{{}^ia_j, {}^ib_j\} f_i$), the evaluation expression c given as the expression (19) hereinabove is generalized as given below:

$$c = \frac{1}{m} \sum_{i=1}^{m} \frac{1}{f_i} \sum_{j=1}^{f_i} ({}^i\alpha_j)^2 \quad (20)$$

In order to determine a minimum value of the evaluation expression c above, for example, the Levemberg-Marquadt minimization method can be applied (as regards the Devemberg-Marquadt minimization method, refer to, for example, J. More, "The Levemberg-Marquadt algorithm, implementation and theory", In G. A. Watson, editor, Numerical Analysis, Lecture Notes in Mathematics 630, Springer-Verlag, 1977).

Figure 16:
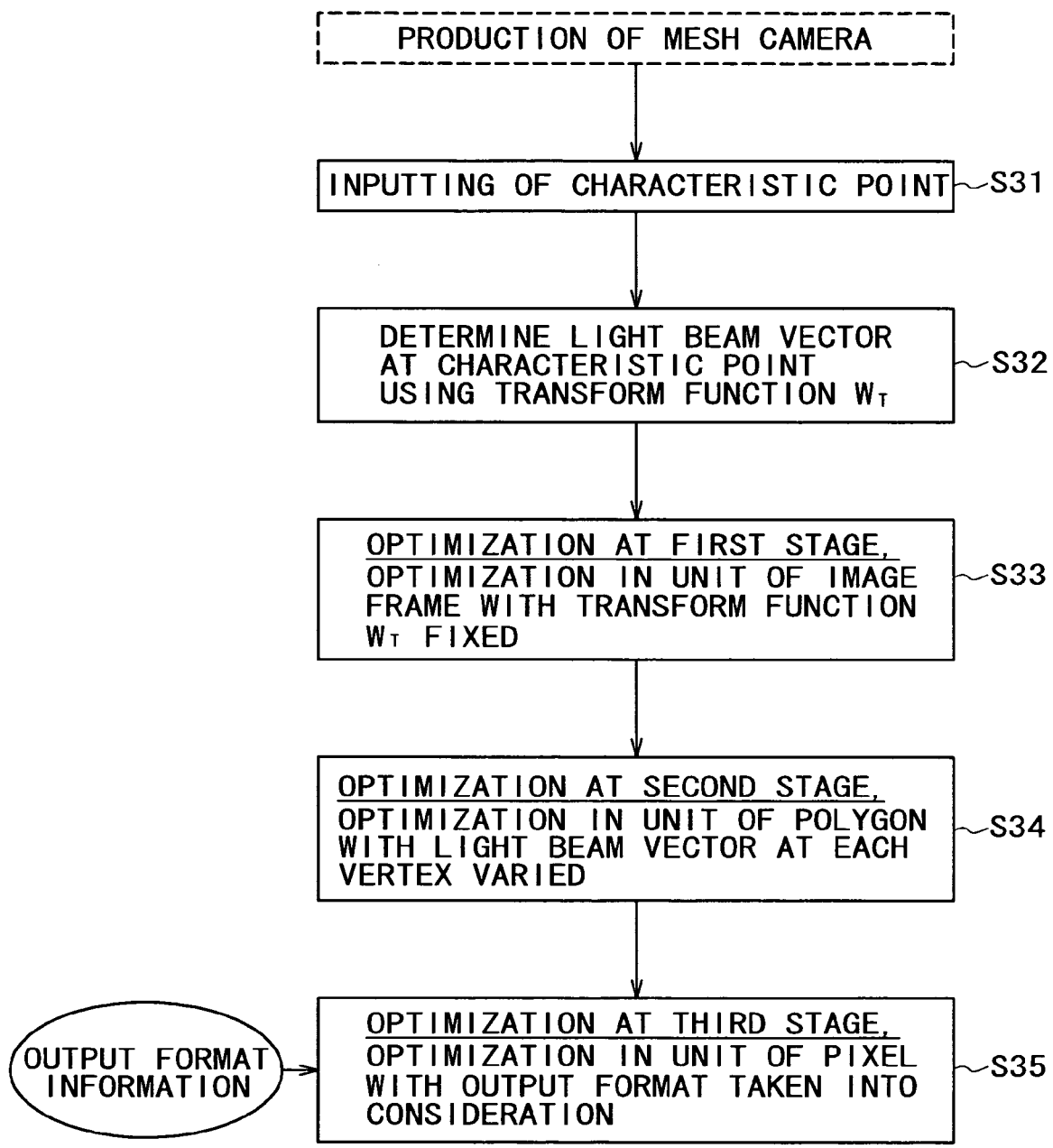
FIG. 16 is a flow chart illustrating an optimization processing procedure for image pasting.

FIG. 16 illustrates, in the form of a flow chart, an optimization processing procedure for image pasting for pasting neighboring images together. The optimization processing procedure is divided into the following three stages of optimization:

(i) first optimization performed in a unit of an image frame while the light beam vectors obtained from the characteristic points are fixed;

(ii) second optimization performed in a unit of a polygon while the light beam vectors, that is, the transform function $W_T$, is varied; and (iii) third optimization performed in a unit of a pixel with an output format after the image pasting taken into consideration.

After the mesh camera is produced (described hereinabove), inputting of characteristic points for image pasting is performed (step S31). The inputting of characteristic points may be performed automatically or manually. The characteristic points are selected, for example, from within a region of high frequency components where pixel comparison can be performed readily.

Then, a light beam vector is calculated for each of the extracted characteristic points (step S32). At this stage, each of the characteristic points other than the vertices of the mesh camera is determined directly from xy coordinate values of the characteristic points on the projection plane using the transform function $W_T$ calculated based on light beams vectors defined by the mesh camera at a plurality of vertices surrounding the characteristic point. For the transform function $W_T$, refer to FIG. 12 and the expressions (14) to (17) given hereinabove.

Then at step S33, the optimization process of the first stage is performed. In particular, an error of light beam vectors at each corresponding characteristic points, that is, an angle $\alpha_j$ defined by the light beam vectors, is calculated between the neighboring image frames, and a root-mean-square of such angles $\alpha_j$ is determined to form such an evaluation expression as given as the expression (20) hereinabove. Then, the Levemberg-Marquadt minimization method or the like is used to perform optimization so that the evaluation expression may exhibit a minimum value.

The optimization process of the first stage, however, is performed with the light beam vectors at the vertices of the polygons kept fixed. As a result, the optimization is performed while the transform function $W_T$ for determining a light beam vector at a characteristic point is kept fixed. This signifies that the image frames are handled as rigid bodies and is equivalent to performance of the optimization process in a unit of an image frame.

Figure 17:
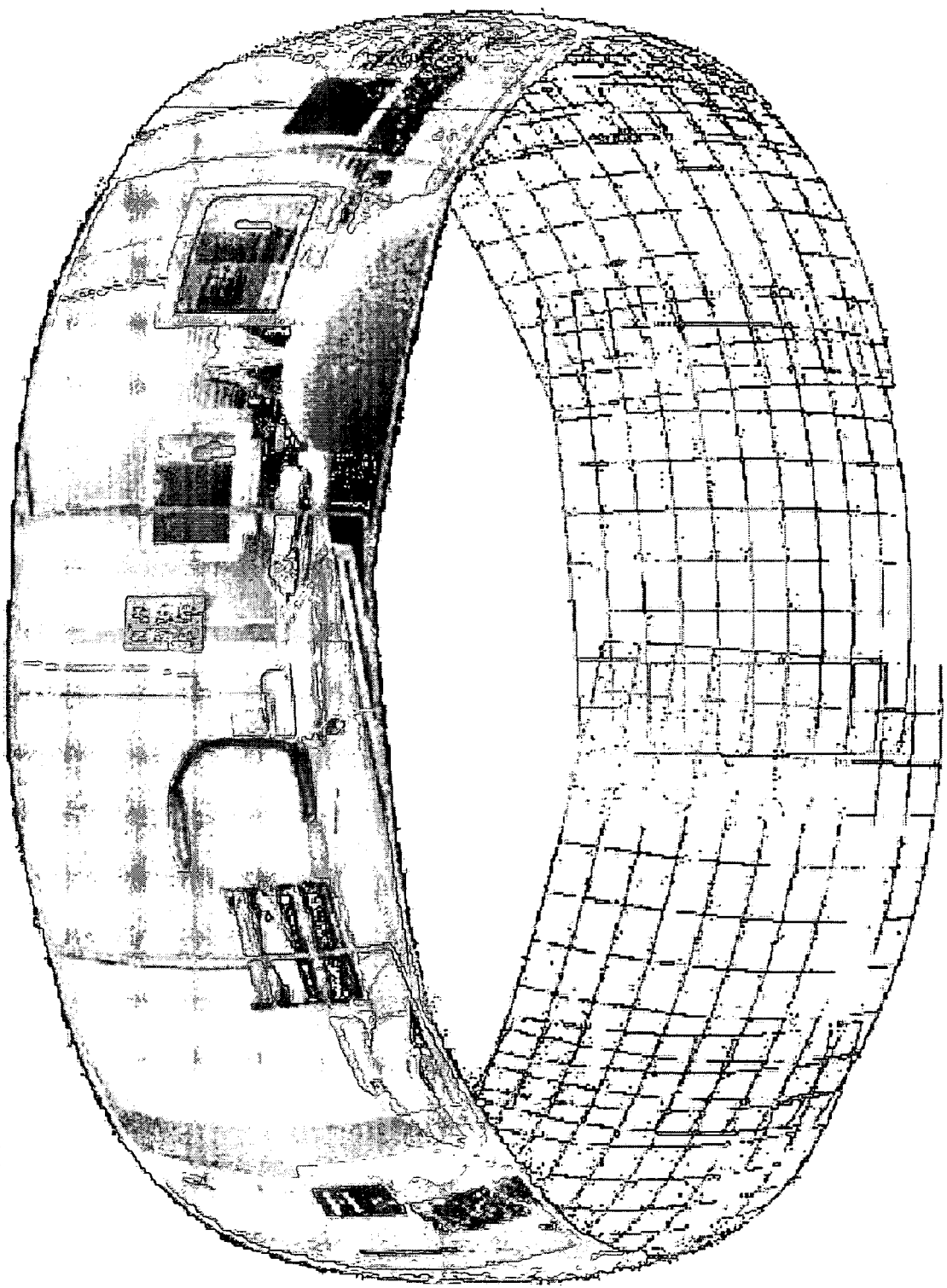
FIG. 17 is a view of an omnidirectional image over 360 degrees produced by optimizing and pasting together a plurality of image frames picked up by a horizontally omnidirectional image pickup apparatus in a unit of an image frame using a mesh camera.
Figure 18:
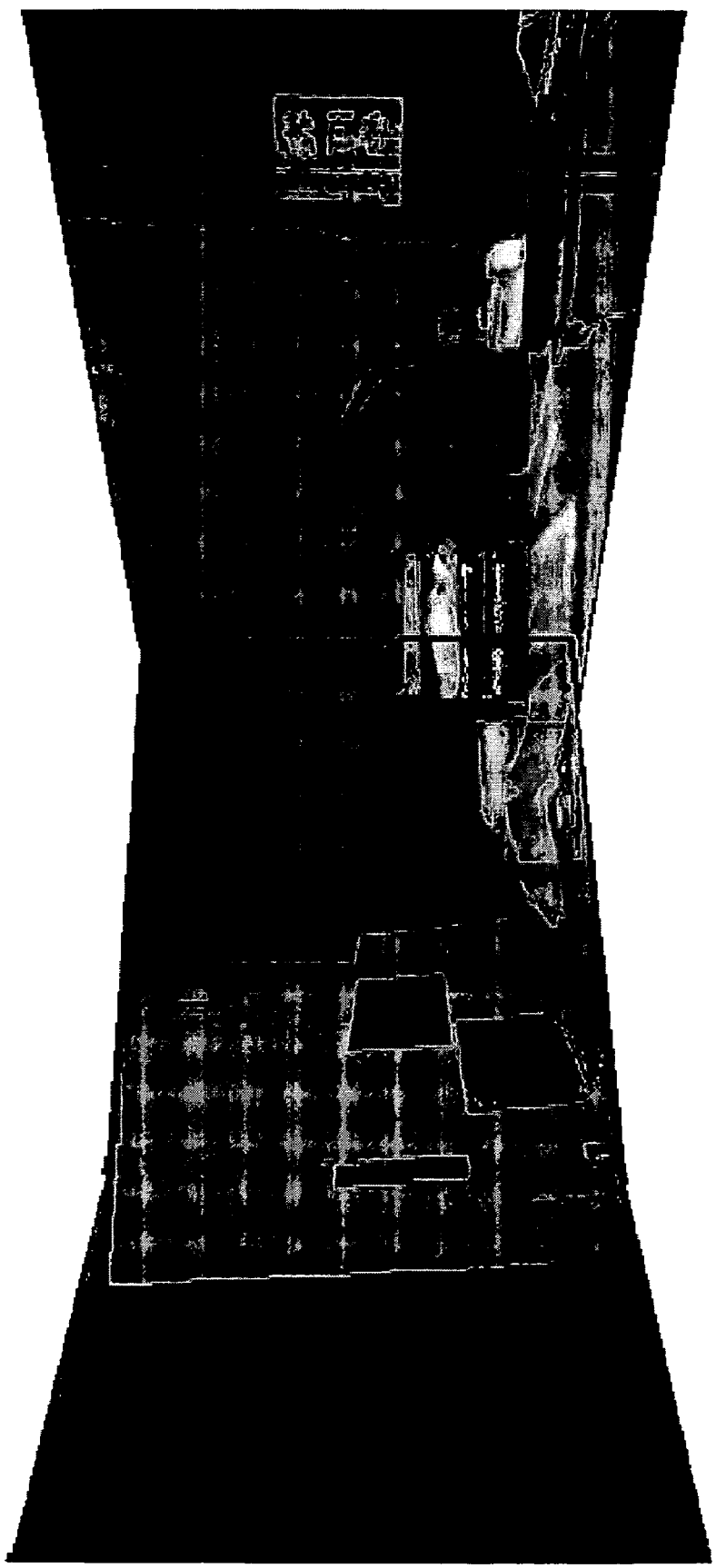
FIG. 18 is a view of the image produced by optimizing and pasting together the plurality of image frames picked up by the horizontally omnidirectional image pickup apparatus in a unit of an image frame using the mesh camera.

FIG. 17 shows an omnidirectional image over 360 degrees obtained by optimizing a plurality of image frames picked up by an omnidirectional image pickup apparatus for a horizontal direction (refer to FIG. 2) in a unit of an image frame using a mesh camera and pasting together the image frames obtained by the optimization process. It is to be noted, however, that, in the example shown in FIG. 17, the omnidirectional image is viewed from the outer side. Meanwhile, FIG. 18 shows the omnidirectional image shown in FIG. 17 as viewed in a predetermined angular field of view from the inner side. Further, FIG. 19 shows a full celestial image type obtained by optimizing a plurality of image frames picked up by an omnidirectional image pickup apparatus of the full celestial image type (refer to FIG. 3) in a unit of an image frame using a mesh camera and pasting together the image frames obtained by the optimization.

Then at step S34, the optimization process at the second stage is performed. In the optimization of the second stage, light beam vectors at vertices of polygons are handled as variable light beam vectors, and it is permitted to vary the transform function $W_T$ in a unit of a polygon. This signifies that a rotatable factor is taken into consideration in a unit of a polygon and is equivalent to performance of an optimization process in a unit of a polygon.

At step S34, the expression (20) is used as an evaluation expression similarly as at step S33. At step S34, however, the parameters $\theta$ and $\phi$ defined at each vertex of the polygons are varied in addition to the rotation R of the entire image frame to vary the transform function $W_T$ in a unit of a polygon. Consequently, the number of unknowns increases. Therefore, it is considered preferable to apply the Bundle Adjustment method in place of the Levemberg-Marquadt minimization method. It is to be noted that, for the Bundle Adjustment method, refer to, for example, B. Triggs, P. McLauchlan, R. Hartley and A. Fitsgibbon, "Bundle Adjustment—A Modern Synthesis", Vision Algorithms: Theory and Practice, Springer Verlag, LNCS, pp. 298-375, 2000.

Then at step S35, the optimization process at the third stage is performed. This stage is characterized in that optimization is performed in a unit of a pixel and that an optimization process is performed taking an output format after image pasting into consideration.

Since data of a pixel value and so forth are not provided in a unit of a pixel, it is necessary to perform interpolation based on vertex data. Usually, pixel interpolation is performed on a projection plane. In the present embodiment, however, an interpolation process is performed not using a projection plane but using a light beam vector. For the interpolation process, a function "Interpolate" is prepared. The Interpolate function involves an interpolation process performed in a $\theta\phi$ polar coordinate space using coordinate values (x, y) on a projection plane and a used camera model C as arguments and returns a result in the form of $\theta\phi$ polar coordinate values.

Figure 20:
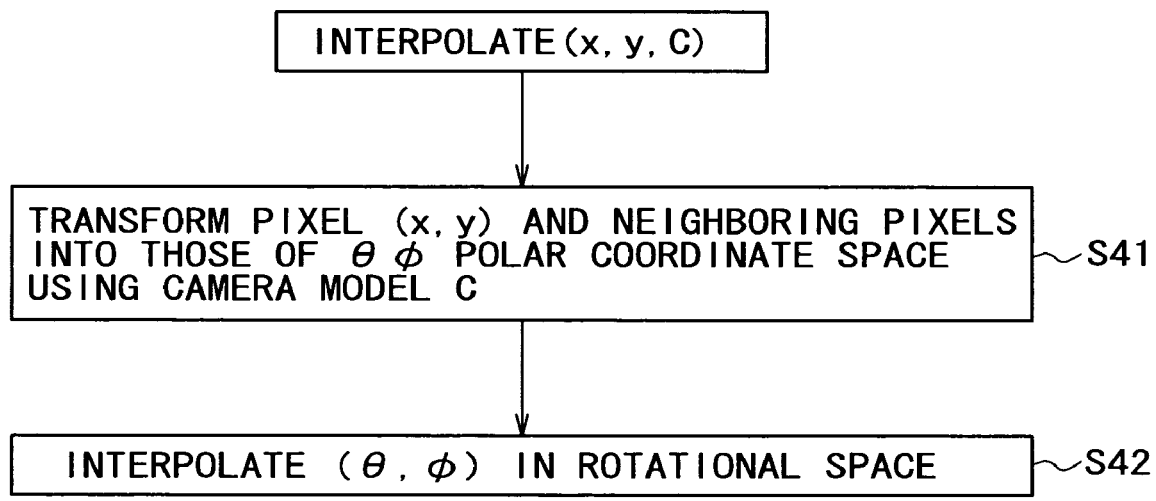
FIG. 20 is a flow chart illustrating a processing procedure of an Interpolate function represented in a simplified manner.

FIG. 20 simply illustrates a processing procedure of the Interpolate function in the form of a flow chart. First, the camera model C is used to transform a pixel position (x, y) and the positions of neighboring pixels into those of the $\theta\phi$ polar coordinate space (step S41). Then, interpolation of $\theta$ and $\phi$ is performed in the $\theta\phi$ rotational space (unit sphere) (step S42).

If interpolation is performed on a projection plane, then it is influenced by the camera model C used or a distortion parameter of the camera model C. On the other hand, if light beam vectors are used to perform interpolation, then influence of them can be excluded.

Figure 21:
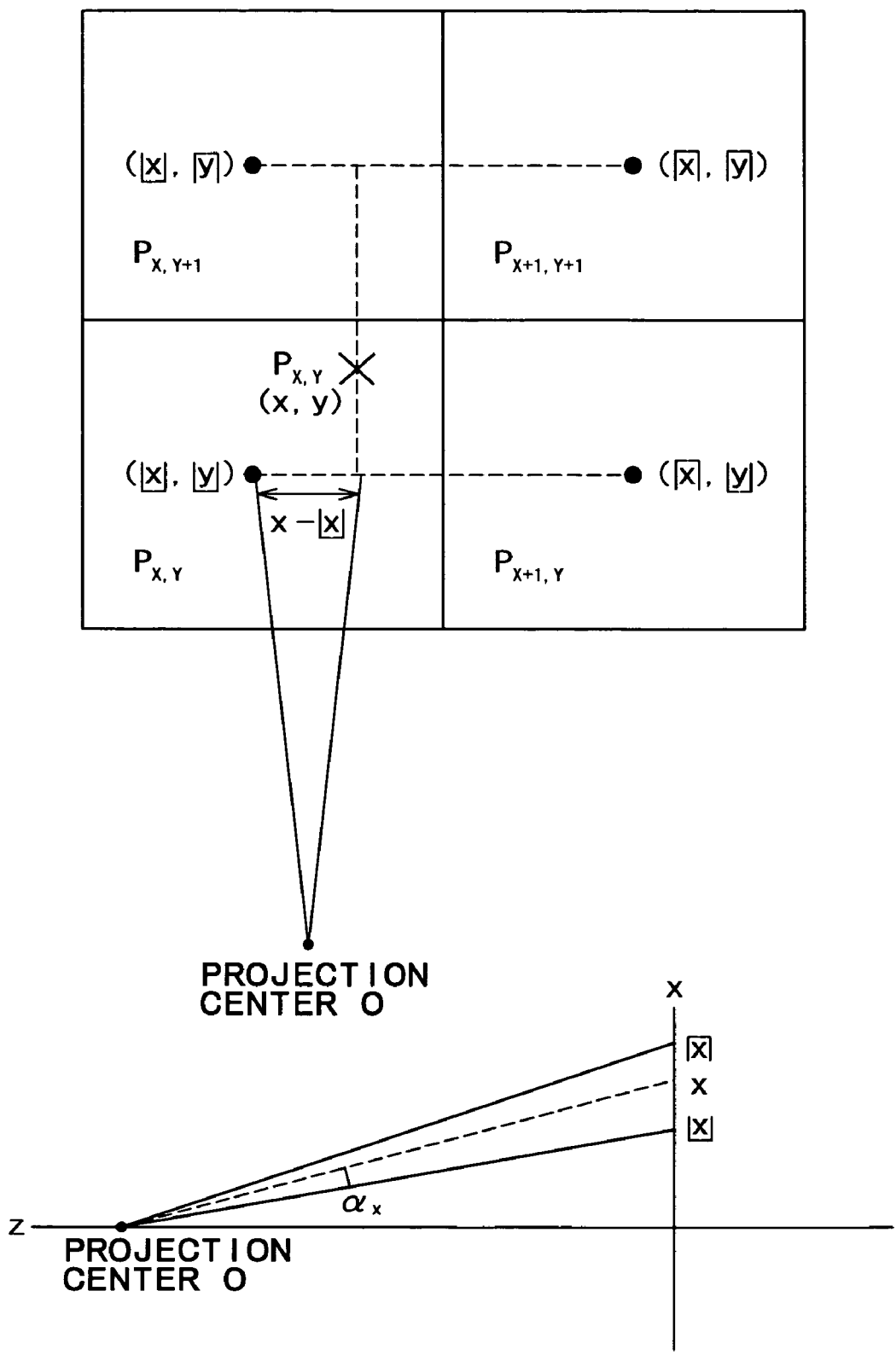
FIG. 21 is a view illustrating a manner in which interpolation of a light beam vector is performed.

FIG. 21 illustrates how interpolation of light beam vectors is performed taking the case of a pinhole camera as an example. Referring to FIG. 21, the position (x, y) of an object of interpolation on a projection plane is represented by $P_{x,y}$, and vertices neighboring the position (x, y) are represented by $P_{X,Y}$, $P_{X+1,Y}$, $P_{X,Y+1}$ and $P_{X+1,Y+1}$. In such an instance, internal division ratios $\alpha_x$ and $\alpha_y$ are represented as given by the following expressions. It is to be noted, however, that the principal point is represented by $(p_x, p_y)$ and the focal length is represented by $(f_x, f_y)$ $$\alpha_x = \frac{\arctan\frac{x - p_x}{f_x} - \arctan\frac{\lfloor x \rfloor - p_x}{f_x}}{\arctan\frac{\lceil x \rceil - p_x}{f_x} - \arctan\frac{\lfloor x \rfloor - p_x}{f_x}} \quad (21)$$

$$\alpha_y = \frac{\arctan\frac{y - p_y}{f_y} - \arctan\frac{l\lfloor y \rfloor - p_y}{f_y}}{\arctan\frac{\lceil y \rceil - p_y}{f_y} - \arctan\frac{\lfloor y \rfloor - p_y}{f_y}}$$

Here, the light beam vector $P_Y$ obtained by interpolation using $P_{X,Y}$ and $P_{X+1,Y}$ is represented as given by the following expression using $\alpha_x$:

$$P_Y = (1-\alpha_x)P_{X,Y} + \alpha_x P_{X+1,Y} \quad (22)$$

Further, the light beam vector $P_{Y+1}$ obtained by interpolation using $P_{X,Y+1}$ and $P_{X+1,Y+1}$ is represented as given by the following expression using $\alpha_x$:

$$P_{Y+1} = (1-\alpha_x)P_{X,Y+1} + \alpha_x P_{X+1,Y+1} \quad (23)$$

Then, the light beam vector $P_{x,y}$ can be represented as given by the following expression using $P_Y$ and $P_{Y+1}$ determined in this manner and the interior division ratio $\alpha_y$:

$$P_{x,y} = (1-\alpha_y)P_Y + \alpha_y P_{Y+1} \quad (24)$$

$P_{x,y}$ can be transformed into a pixel position (x, y) on the projection plane using the RayToImage function.

The output format signifies a format in which image data obtained by pasting of a plurality of image frames together are mapped. For example, where the omnidirectional image pickup apparatus is of the type which picks up, such an omnidirectional full circumferential image over 180 degrees as shown in FIG. 2, the surface of a cylinder may be used as an output format. Else, where the omnidirectional image pickup apparatus is of the type which picks up an image of the full celestial image type, the surface of a sphere may be used as an output format. Naturally, the output format need not necessarily be same as the input format to the image pickup apparatus.

FIGS. 22 to 25 show texture mapping examples where the output format of a similar omnidirectional image is set to the surface of a regular tetrahedron, the surface of a regular icosahedron, the surface of a regular dodecahedron and the surface of a sphere, respectively.

As can be seen also from FIGS. 22 to 25, the output format is any non-planar face, and the solid angle $\Omega$ after mapping differs depending upon the position of a pixel of an original image. Also at a point of time of an original image, the reliability w differs among different pixels.

Therefore, in the present embodiment, when optimization is performed in a unit of a pixel in the optimization processing procedure at the third stage, the ImageToRay function is used to transform the pixel positions (x, y) into light beam vectors r to handle them as such. Further, the light intensity of each pixel r is represented by a function l(r) and the reliability of each pixel is represented by w(r). The evaluation expression in this instance can be represented as given by the following expression. It is to be noted, however, that the output format has a w×h pixel size, and the number of original images (number of cameras) is n.

$$\sum_{i=1}^{width} \sum_{j=1}^{height} \Omega_{ij} \sum_{p=1}^{n} \sum_{q=1}^{n} \{w_p(\vec{r}_{ij})l_p(\vec{r}_{ij}) - w_q(\vec{r}_{ij})l_q(\vec{r}_{ij})\}^2 \quad (25)$$

This evaluation expression determines the square of errors in light intensity of corresponding light vectors between neighboring image frames and takes, upon calculation, the reliability of each pixel and the solid angle $\Omega_{i,j}$ defined by the origin of the output format and each pixel, which relies upon the output format, into consideration. By determining a minimum value of the evaluation expression, optimization in collation between images can be performed in a unit of a pixel.

It is to be noted that, for an optimization process of the evaluation expression given above, the Levemberg-Marquadt minimization method (described hereinabove) can be applied.

Supplement

The present invention has been described in detail with reference to a particular embodiment. However, it is apparent that those skilled in the art can modify or alter the embodiment without departing from the subject matter of the present invention. In other words, the present invention has been disclosed by way of illustration and shall not be interpreted restrictively. In order to determine the subject matter of the present invention, the claims should be taken into consideration.

INDUSTRIAL APPLICABILITY

According to the present invention, a superior image processing apparatus and image processing method, storage medium and computer program can be provided by which images picked up from neighboring regions of a space using a plurality of cameras can be pasted together suitably.

Further, according to the present invention, a superior image processing apparatus and image processing method, storage medium, and computer program can be provided by which images picked up by cameras different in terms of the lens distortion or the camera model can be pasted together suitably.

Furthermore, according to the present invention, a superior image processing apparatus and image processing method, storage medium, and computer program can be provided by which image picked up by cameras different in terms of the lens distortion or the camera model can be pasted together without deterioration of the images which may be caused by transformation of the images into those of a different camera model such as a pinhole camera.

The invention claimed is:

1. An image processing apparatus for pasting together a plurality of image frames picked up by different cameras, the apparatus comprising:
    mesh camera generating means for generating a mesh camera based on a camera model, the mesh camera establishing in advance a relation between vertex coordinates of polygons on a projection plane and coordinates of light beam vectors corresponding to the vertex coordinates;
    light beam vector calculation means for calculating a light beam vector projected at a point of a projection plane by said cameras used for image pickup based on the mesh camera; and
    optimization means for minimizing an error of information obtained from light beam vectors of characteristic points at neighboring image frames so as to paste the image frames, and optimizing an evaluation expression based on an output format by varying the light beam vector of the vertex coordinates of polygons of the pasted image frames mapped to a surface of the output format.

2. An image processing apparatus according to claim 1, wherein the mesh camera generating means divides the projection plane of each of said cameras into numerous polygons, and said optimization means determines a transform function for transforming the coordinate values of individual points in the polygons on the projection plane based on the light beam vectors at the vertices of the polygons and uses the transform function to calculate the light beam vectors at the characteristic points.

3. An image processing apparatus according to claim 2, wherein said optimization means calculates the transform function from a characteristic point into a light beam vector in a unit of a polygon and performs an optimization process in a unit of an image frame so that an error of information based on the light beam vectors at the characteristic points may be minimized while fixed transform functions are used as the transform functions.

4. An image processing apparatus according to claim 2, wherein said optimization means calculates the transform function from a characteristic point into a light beam vector in a unit of a polygon and performs an optimization process in a unit of a polygon so that an error of information based on the light beam vectors at the characteristic points may be minimized while variable transform functions are used as the transform functions.

5. An image processing apparatus according to claim 2, wherein said optimization means takes into consideration a light intensity of each pixel, a reliability of each pixel, and a solid angle of each pixel on the surface of the output format to minimize the evaluation expression.

6. An image processing method for pasting together a plurality of image frames picked up by different cameras, the method comprising:
   generating a mesh camera based on a camera model, the mesh camera establishing in advance a relation between vertex coordinates of polygons on a projection plane and coordinates of light beam vectors corresponding to the vertex coordinates;
   calculating a light beam vector projected at a point of a projection plane by said cameras used for image pickup based on the mesh camera; and
   minimizing an error of information obtained from light beam vectors of corresponding characteristic points at neighboring image frames so as to paste the image frames, and optimizing an evaluation expression based on an output format by varying the light beam vector of the vertex coordinates of polygons of the pasted image frames mapped to a surface of the output format.

7. An image processing method according to claim 6, wherein generating the mesh camera further comprises dividing the projection plane of each of said cameras into numerous polygons, and minimizing the error further comprises determining a transform function for transforming the coordinate values of individual points in the polygons on the projection plane based on the light beam vectors at the vertices of the polygons and using the transform function to calculate the light beam vectors at the characteristic points.

8. An image processing method according to claim 7, wherein minimizing the error further comprises calculating the transform function from a characteristic point into a light beam vector in a unit of a polygon and performing an optimization process in a unit of an image frame so that an error of information based on the light beam vectors at the characteristic points may be minimized while fixed transform functions are used as the transform functions.

9. An image processing method according to claim 7, wherein minimizing the error further comprises calculating the transform function from a characteristic point into a light beam vector in a unit of a polygon and performing an optimization process in a unit of a polygon so that an error of information based on the light beam vectors at the characteristic points may be minimized while variable transform functions are used as the transform functions.

10. An image processing method according to claim 7, wherein minimizing the error further comprises taking into consideration a light intensity of each pixel, a reliability of each pixel, and a solid angle of each pixel on the surface of the output format to minimize the evaluation expression.

11. A computer readable medium in or on which computer software which describes a method for pasting together a plurality of image frames picked up by different cameras so that the method may be executed on a computer system is physically stored in a computer-readable form, the method comprising:
   generating a mesh camera based on a camera model, the mesh camera establishing in advance a relation between vertex coordinates of polygons on a projection plane and coordinates of light beam vectors corresponding to the vertex coordinates;
   calculating a light beam vector projected at a point of a projection plane by said cameras used for image pickup based on the mesh camera; and
   minimizing an error of information obtained from light beam vectors of corresponding characteristic points at neighboring image frames so as to paste the image frames, and optimizing an evaluation expression based on an output format by varying the light beam vector of the vertex coordinates of polygons of the pasted image frames mapped to a surface of the output format.

* * * * *